US012684327B2

(12) United States Patent
Orsino et al.

(10) Patent No.: US 12,684,327 B2
(45) Date of Patent: Jul. 14, 2026

(54) METHODS AND TERMINAL DEVICES FOR ENHANCED DISCOVERY PROCEDURE

(71) Applicant: Telefonaktiebolaget LM Ericsson (publ), Stockholm (SE)

(72) Inventors: Antonino Orsino, Kirkkonummi (FI); Zhang Zhang, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 18/026,841

(22) PCT Filed: Aug. 30, 2021

(86) PCT No.: PCT/CN2021/115357
§ 371 (c)(1),
(2) Date: Mar. 17, 2023

(87) PCT Pub. No.: WO2022/057605
PCT Pub. Date: Mar. 24, 2022

(65) Prior Publication Data
US 2023/0336961 A1 Oct. 19, 2023

(51) Int. Cl.
*H04W 8/00* (2009.01)
*H04W 28/02* (2009.01)
(Continued)

(52) U.S. Cl.
CPC ....... *H04W 8/005* (2013.01); *H04W 28/0268* (2013.01); *H04W 40/026* (2013.01);
(Continued)

(58) Field of Classification Search
CPC ........... H04W 8/005; H04W 28/02668; H04W 40/026; H04W 40/12; H04W 48/04;
(Continued)

(56) References Cited

U.S. PATENT DOCUMENTS

| | | | |
|---|---|---|---|
| 12,245,326 B2 * | 3/2025 | Liang | H04W 28/0268 |
| 12,262,429 B2 * | 3/2025 | Freda | H04W 76/27 |

(Continued)

FOREIGN PATENT DOCUMENTS

| | | |
|---|---|---|
| CN | 104704906 A | 6/2015 |
| CN | 105338513 A | 2/2016 |

(Continued)

OTHER PUBLICATIONS

Intel Corporation, "R2-2006718: Characteristics of L2 and L3-based Sidelink Relaying," 3GPP TSG-RAN WG2 Meeting #111, Aug. 17-28, 2020, Electronic Meeting, 23 pages.

(Continued)

*Primary Examiner* — Eunsook Choi
(74) *Attorney, Agent, or Firm* — Withrow & Terranova, PLLC

(57) ABSTRACT

The present disclosure provides a method in a first terminal device. The method includes transmitting, to a second terminal device, a first message for initiating a discovery procedure over a sidelink. The first message contains one or more of following information associated with the first terminal device: first application or traffic related information, first location or mobility related information, or first connectivity related information.

21 Claims, 10 Drawing Sheets

310

Transmit, to a second terminal device, a first message for initiating a discovery procedure over a sidelink

300

(51) Int. Cl.
| | |
|---|---|
| *H04W 40/02* | (2009.01) |
| *H04W 40/12* | (2009.01) |
| *H04W 48/04* | (2009.01) |
| *H04W 48/14* | (2009.01) |

(52) U.S. Cl.
CPC ........... *H04W 40/12* (2013.01); *H04W 48/04* (2013.01); *H04W 48/14* (2013.01)

(58) Field of Classification Search
CPC ..... H04W 48/14; H04W 88/04; H04W 92/10; H04W 92/18
See application file for complete search history.

(56) References Cited

U.S. PATENT DOCUMENTS

| | | | | |
|---|---|---|---|---|
| 12,267,909 | B2 * | 4/2025 | Wu | H04W 24/10 |
| 12,284,589 | B2 * | 4/2025 | Hoang | H04W 88/04 |
| 12,335,841 | B2 * | 6/2025 | Wang | H04W 76/14 |
| 2015/0271657 | A1 | 9/2015 | Xiong et al. | |
| 2016/0285539 | A1 * | 9/2016 | Sadiq | H04W 8/005 |
| 2018/0317077 | A1 | 11/2018 | Kim et al. | |
| 2023/0164536 | A1 * | 5/2023 | Back | H04W 8/005 |
| | | | | 370/329 |
| 2025/0202604 | A1 * | 6/2025 | Hoang | H04B 17/328 |

FOREIGN PATENT DOCUMENTS

| | | |
|---|---|---|
| CN | 109644460 A | 4/2019 |
| CN | 111247820 A | 6/2020 |

OTHER PUBLICATIONS

Mediatek Inc., "R2-2006570: Scenarios and Assumptions on Sidelink Relay," 3GPP TSG-RAN WG2 Meeting #111, Aug. 17-28, 2020, Electronic Meeting, 4 pages.

Samsung Electronics, "R2-2006969: Sidelinks relay discovery model and procedure," 3GPP TSG-RAN WG2 Meeting #111, Aug. 17-28, 2020, 3 pages.

ZTE Corporation, et al., "R2-2006736: Discussion on relay initiation and relay UE (re-)selection," 3GPP TSG-RAN WG2 Meeting #111, Aug. 17-28, 2020, Electronic Meeting, 6 pages.

Notice of Reasons for Rejection for Japanese Patent Application No. 2023-517870, mailed Apr. 23, 2024, 13 pages.

Author Unknown, "Technical Specification Group Services and System Aspects; Study on enhancement of 3GPP Support for 5G V2X Services (Release 16)," Technical Report 22.886, Version 16.2.0, Dec. 2018, 3GPP Organizational Partners, 76 pages.

Author Unknown, "Technical Specification Group Services and System Aspects; Study on system enhancement for Proximity based Services (ProSe) in the 5G System (5GS) (Release 17)," Technical Report 23.752, Version 0.3.0, Jan. 2020, 3GPP Organizational Partners, 73 pages.

Author Unknown, "Technical Specification Group Services and System Aspects; Architecture enhancements for 5G System (5GS) to support Vehicle-to-Everything (V2X) services (Release 16)," Technical Specification 23.287, Version 16.3.0, Jul. 2020, 3GPP Organizational Partners, 57 pages.

Author Unknown, "Technical Specification Group Services and System Aspects; Proximity-based services (ProSe); Stage 2 (Release 16)," Technical Specification 23.303, Version 16.0.0, Jul. 2020, 3GPP Organizational Partners, 130 pages.

Catt, "R2-1813731: Discovery Procedure and Connection Setup Procedure in NR Sidelink," 3GPP TSG-RAN WG2 Meeting #103bis, Oct. 8-12, 2018, Chengdu, China, 4 pages.

Ericsson, "R2-2007291: Discovery aspects for NR sidelink relay," 3GPP TSG-RAN WG2 #111e, Electronic Meeting, Aug. 17-28, 2020, 4 pages.

Mediatek Inc., "R2-2006573: Initiation of relaying operation," 3GPP TSG-RAN WG2 Meeting #111, Electronic Meeting, Aug. 17-28, 2020, 8 pages.

Oppo, "RP-193253: New SID: Study on NR sidelink relay," 3GPP TSG RAN Meeting #86, Dec. 9-12, 2019, Sitges, Spain, 5 pages.

International Search Report and Written Opinion for International Patent Application No. PCT/CN2021/115357, mailed Nov. 25, 2021, 12 pages.

Ericsson, "R2-2009228: Remaining aspects for discovery," 3GPP TSG-RAN WG2 #112e, Nov. 2-13, 2020, Electronic Meeting, 6 pages.

Ericsson, "R2-2009229: Remaining aspects for relay selection and reselection," 3GPP TSG-RAN WG2 #112e, Nov. 2-13, 2020, Electronic Meeting 6 pages.

Zte, et al., "R2-2009029: Discussion on relay initiation and relay UE (re-)selection," 3GPP TSG-RAN WG2 Meeting #112-e, Nov. 2-13, 2020, Electronic Meeting, 6 pages.

Zte, et al., "R2-2009032: Discussion on Sidelink relay discovery," 3GPP TSG-RAN WG2 Meeting #112e, Nov. 2-13, 2020, Electronic Meeting, 5 pages.

Decision to Grant for Japanese Patent Application No. 2023-517870, mailed Aug. 13, 2024, 6 pages.

Extended European Search Report for European Patent Application No. 21868433.0, mailed Sep. 16, 2024, 11 pages.

First Office Action for Chinese Patent Application No. 202180063571.8, mailed Oct. 22, 2025, 32 pages.

Notification of Grant for Chinese Patent Application No. 202180063571.8, mailed Apr. 30, 2026, 7 pages.

* cited by examiner

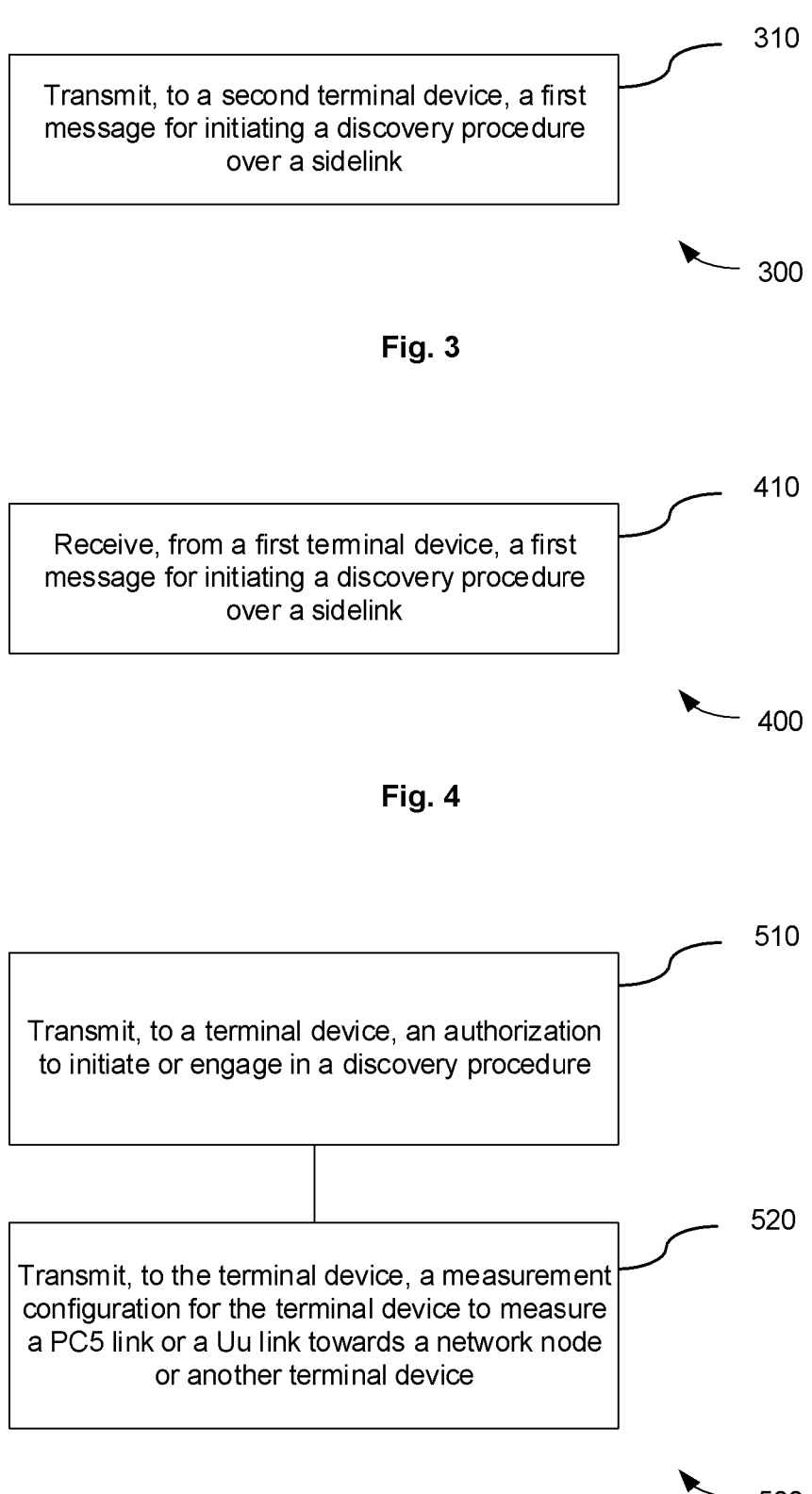

310

Transmit, to a second terminal device, a first message for initiating a discovery procedure over a sidelink

Receive, from a first terminal device, a first message for initiating a discovery procedure over a sidelink

Transmit, to a terminal device, an authorization to initiate or engage in a discovery procedure

520

Transmit, to the terminal device, a measurement configuration for the terminal device to measure a PC5 link or a Uu link towards a network node or another terminal device

FIRST TERMINAL
DEVICE 600

FIRST TERMINAL
DEVICE 700

SECOND TERMINAL
DEVICE 800

SECOND TERMINAL
DEVICE 900

NETWORK NODE 1000

NETWORK NODE 1100

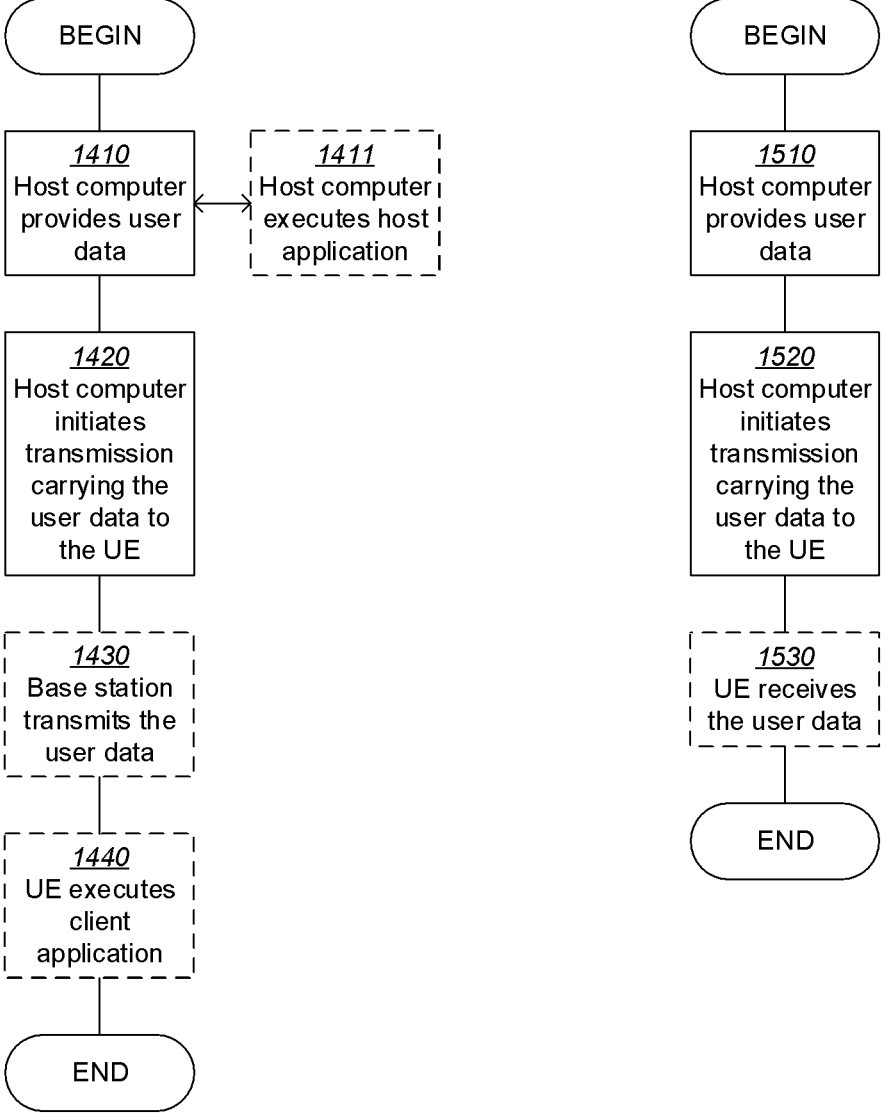
FIG. 14                    FIG. 15

METHODS AND TERMINAL DEVICES FOR ENHANCED DISCOVERY PROCEDURE

This application is a 35 U.S.C. § 371 national phase filing of International Application No. PCT/CN2021/115357, filed Aug. 30, 2021, which claims the benefit of International Application No. PCT/CN2020/116353, filed Sep. 20, 2020, the disclosures of which are incorporated herein by reference in their entireties.

TECHNICAL FIELD

The present disclosure relates to communication technology, and more particularly, to methods and terminal devices for enhanced discovery procedure.

BACKGROUND

In the $3^{rd}$ Generation Partnership Project (3GPP) Release 14 and Release 15, Device-to-Device (D2D) communication has been extended to support Vehicle-to-Everything (V2X) communication, which includes any combination of direct communication between vehicles, pedestrians and infrastructures. V2X communication may take advantage of a network infrastructure, when available, but at least basic V2X connectivity should be possible even in case of lack of coverage of the network infrastructure.

FIG. 1 shows V2X scenarios with a Long Term Evolution (LTE) based network infrastructure. Providing an LTE-based V2X interface may be economically advantageous because of the LTE's economies of scale, and may enable tighter integration between communications with the network infrastructure (Vehicle-to-Infrastructure/Network, or V2I/N), pedestrian (Vehicle-to-Pedestrian, or V2P) and other vehicles (Vehicle-to-Vehicle, or V2V), as compared to using a dedicated V2X technology (e.g., Institute of Electrical and Electronic Engineers (IEEE) 802.11p).

V2X communications may carry non-safety and/or safety information. Applications and/or services may be associated with specific requirements sets, e.g., in terms of latency, reliability, data rate, etc. There are several different use cases defined for V2X, including:

V2V: covering LTE-based communication between vehicles, either via a cellular interface (known as Uu) or via a sidelink interface (known as PC5);

V2P: covering LTE-based communication between a vehicle and a device carried by an individual (e.g. handheld terminal carried by a pedestrian, cyclist, driver or passenger), either via Uu or sidelink (PC5); and V2I/N: covering LTE-based communication between a vehicle and a Roadside unit (RSU) or network. An RSU is a transportation infrastructure entity (e.g., an entity transmitting speed notifications) that communicates with V2X capable User Equipments (UEs) over sidelink (PC5) or over Uu. For V2N, the communication is performed over Uu.

The 3GPP System Architecture 1 (SA1) working group has completed new service requirements for future V2X services in future study on enhancement of V2X (FS_eV2X). The SA1 working group has identified 25 use cases for advanced V2X services which will be used in the 5th Generation (5G) system, i.e., LTE and New Radio (NR). These use cases are categorized into four use case groups: vehicles platooning, extended sensors, advanced driving and remote driving. Direct unicast transmission over sidelink will be needed in some use cases such as platooning, cooperative driving, dynamic ride sharing, etc. For these advanced applications, expected requirements to meet the needed data rate, capacity, reliability, latency, communication range, and speed are more stringent. The consolidated requirements for each use case group are captured in the 3GPP Technical Report (TR) 22.886, V16.2.0.

In the 3GPP Release 17, National Security and Public Safety (NSPS) is considered to be one important use case, which can benefit from the already developed NR sidelink features in Release16. Therefore, it is most likely that 3GPP will specify enhancements related to the NSPS use case taking the NR Release 16 sidelink as a baseline. Besides, in some scenarios, NSPS services, such as indoor firefighting, forest firefighting, earthquake rescue, sea rescue, etc., need to operate with partial or even no network coverage, e.g., when the infrastructure is (partially) destroyed or not available. Therefore, coverage extension is a crucial enabler for the NSPS services, for both NSPS services communicated between UEs and cellular networks and NSPS services communicated between UEs over sidelinks. In Release 17, a new Study Item Description (SID) on NR sidelink relay (RP-193253) is launched, aiming to further explore coverage extension for sidelink-based communication, including both UE-to-Network relay for cellular coverage extension and UE-to-UE relay for sidelink coverage extension.

Sidelink transmissions are associated with a source Layer 1 (L1)/Layer 2 (L2) Identifier (ID) and a destination L1/L2 ID. For a sidelink unicast transmission, a source L1/L2 ID represents a service type and/or a transmitter UE ID, which will be a destination L1/L2 ID for a peer UE. A sidelink unicast link is identified by a combination of source L1/L2 ID and destination L1/L2 ID. For a sidelink groupcast transmission, a source L1/L2 ID represents a transmitter UE ID, and a destination L1/L2 ID represents a group identifier provided by an upper layer or a service type. For a sidelink broadcast transmission, a source L1/L2 ID represents a transmitter UE ID, and a destination L1/L2 ID represents a service type. A connected UE will report a destination L2 ID to its serving cell or network node.

SUMMARY

As described in Section 6.1 of TR 23.752, V0.3.0, which is incorporated herein by reference in its entirety, a discovery procedure which is being studied for NR Release 17 is based on the 5G Core (5GC) architecture, including authorization and provision, announcing and monitoring procedures, and a discovery procedure as detailed in Section 6.1.2 of TR 23.752. In the Evolved Packet System (EPS), there are two types of Proximity Service (ProSe) Direct Discovery: open and restricted. The open discovery is the case where there is no explicit permission that is needed from the UE being discovered, whereas the restricted discovery only takes place with explicit permission from the UE that is being discovered. Besides, there are two models for ProSe Direct Discovery in EPS: Model A and Model B, defined in Section 5.3.1.2 of TS 23.303, V16.0.0, which is incorporated herein by reference in its entirety.

For direct discovery authorization and provision to a UE, it is expected that an Application Function (AF) can provide group and/or service information to a Policy Control Function (PCF) via a Network Exposure Function (NEF) and the PCF can provide authorization to a UE according to the received information from the AF. The authorization and provision procedures in Sections 6.2.2 and 6.2.5 of TS 23.287, V16.3.0 are reused to provide at least the following configurations:

1) AF request sent to the PCF (or via NEF) contains the following information:

Service information to be directly discovered over PC5 interface (the service information can contain, e.g., an application identifier);

Group information (e.g., an external group identifier) to be directly discovered over PC5 interface;

Information per announcing and monitoring direction for Model A or per discoverer UE and discoveree UE for Model B;

Area information, e.g., geographical information (longitude/latitude, zip code, etc).

2) Provision to the UE from the PCF contains the following information based on the information received from the AF and a local policy:

Service information to be directly discovered over PC5 interface (the service information can contain, e.g., an application identifier);

Group information (e.g., an external group identifier) to be directly discovered over PC5 interface;

Area information used for direct discovery over PC5 interface (the area information could be geographical Tracking Area (TA) list; it is expected that PCF will map the area information provided by the AF to a list of TAs);

Security parameters used for direct discovery over PC5.

If an Access and Mobility Management Function (AMF) determines that the UE is authorized to use the direct discovery based on the authorized area information, the AMF indicates to a corresponding Next Generation Radio Access Network (NG-RAN) during an N2 establishment for the UE that the UE is authorized to use the direct discovery over the PC5 interface.

FIG. 2 shows an example of a discovery procedure. At 2.0, the user may obtain ProSe application user ID and ProSe application code for ProSe direct discovery using application layer mechanisms. The application layer in the UE provides application user ID and the application identifier to the ProSe Application Function. The ProSe Application Function allocates a ProSe application user ID and ProSe application code to the application layer in the UE. At 2.1, the UE obtains the authorization and provision for announcing discovery and/or for monitoring/solicitation discovery as defined in Sections 6.2.2 and 6.2.5 of TS 23.287, which is incorporated herein by reference in its entirety.

For Model A, at 2.2a, when the announcing UE is triggered e.g., by an upper layer application to announce availability for interested groups and/or for interested applications, if the UE is authorized to perform the announcing UE procedure for the interested groups and/or the interested applications in step 2.1, then the UE shall generate a PC5 direct discovery message for announcement and includes the following information in this message. The announcing UE computes a security protection element (e.g., for integrity protection) and appends it to the PC5 message:

1) ProSe UE ID, e.g., ProSe application user ID, Layer 2 ID;

2) Group ID(s) provided by the application layer; and

3) Application ID(s) or ProSe application code(s) provided by the application layer.

When the monitoring UE is triggered e.g., by an upper layer application or by the user to monitor proximity of other UEs for the interested group(s) and/or interested applications, and if the UE is authorized to perform the monitoring procedure for the group(s) and/or applications, then the UE monitors the discovery message. The monitoring UE verifies the security protection element using the provisioned security parameters corresponding to the application. If the verification of the security protection element succeeds, the service is successfully discovered by the monitoring UE. The monitoring UE may then notify the application layer using the result of the discovery.

For Model B, at 2.2b, when the discoverer UE is triggered e.g. by an upper layer application or by the user to discover other UEs for the interested group(s) and/or interested applications, and if the UE is authorized to perform the discovery solicitation procedure for the group(s) and/or applications in step 2.1, then the UE sends solicitation message with the information of discoverer ProSe UE ID, application ID(s) or ProSe application code(s), group ID(s). The discoverer UE computes a security protection element (e.g. for integrity protection) and appends it to the PC5 message. If the discoveree UE is able to and authorised to respond to the discovery solicitation according to the received information in the solicitation message, then it responds to the discovery message with the discoveree ProSe UE ID, the supported application ID(s) or ProSe application code(s) and group ID(s).

At 2.3a, if the monitoring UE/discoverer UE wants to request metadata corresponding to the discovered service in step 2.2a or 2.2b, the monitoring UE/discoverer UE may send a unicast metadata request message to request discovery metadata. The monitoring UE/discoverer UE may use the Layer 2 ID of announcing UE/discoveree UE (received in step 2.2a or 2.2b) to send the Metadata Request message. At 2.3b, the announcing UE/discoveree UE responds with the Metadata Response message. The announcing UE/discoveree UE includes the metadata information in the Metadata Response message.

It has been agreed that Model A and Model B discovery procedures standardized in LTE Release 12/Release13 can be re-used for the sidelink UE-to-Network and UE-to-UE relay in Release 17.

However, the NR sidelink is fundamentally different from the LTE V2X. Current standardized discovery procedures need to be enhanced to meet the requirements for the V2X and public safety scenarios. These requirements include power saving, low latency, and reliability. Further, the existing discovery procedures are not optimized from the signaling overhead perspective and require a UE to perform the discovery procedure every time a new relay path should be selected/reselected.

It is an object of the present disclosure to provide terminal devices and methods therein, capable of solving or mitigating at least one of the above problems.

According to a first aspect of the present disclosure, a method in a first terminal device is provided. The method includes: transmitting, to a second terminal device, a first message for initiating a discovery procedure over a sidelink. The first message contains one or more of following information associated with the first terminal device: first application or traffic related information, first location or mobility related information, or first connectivity related information.

In an embodiment, the first message may further contain a first validity timer indicating a duration during which the information associated with the first terminal device is valid.

In an embodiment, the first application or traffic related information may include a Quality of Service (QoS) profile of an application or traffic the first terminal device requests or is capable of providing.

In an embodiment, the QoS profile may include a type, a priority, and/or a QoS requirement of the application or traffic.

In an embodiment, the first location or mobility related information may include one or more of: location information of the first terminal device, information on an area or proximity where the first terminal device requests or is capable of providing an application or traffic, or mobility information of the first terminal device.

In an embodiment, the mobility information of the first terminal device may indicate whether the first terminal device is static or moving.

In an embodiment, the first connectivity related information may include: a serving network node of the first terminal device, an indication of whether the first terminal device requests or is capable of providing a relay path towards a network node or a terminal device, a list of identifiers of terminal devices that have been obtained in a previous discovery procedure, a radio quality indication of a PC5 or Uu link the first terminal device currently has, a load or a congestion condition of the PC5 or Uu link, a Radio Access Technology (RAT) of the PC5 or Uu link, an indication of a relay type the first terminal device requests or is capable of providing, or a number of hops or a maximum number of hops along a relay path the first terminal device requests or is capable of providing.

In an embodiment, the method may further include: receiving, from the second terminal device, a second message as a response to the first message. The second message contains one or more of following information associated with the second terminal device: identifier information, second application or traffic related information, second location or mobility related information, or second connectivity related information.

In an embodiment, the identifier information may include one or more of: a global identifier of the second terminal device, a temporary identifier of the second terminal device, and/or an identifier of the second terminal device used only when the second terminal device serves as a relay for the first terminal device.

In an embodiment, the second application or traffic related information may include a QoS profile of an application or traffic the second terminal device requests or is capable of providing.

In an embodiment, the QoS profile may include a type, a priority, and/or a QoS requirement of the application or traffic the second terminal device requests or is capable of providing.

In an embodiment, the second location or mobility related information may include one or more of: location information of the second terminal device, information on an area or proximity where the second terminal device requests or is capable of providing an application or traffic, or mobility information of the second terminal device.

In an embodiment, the mobility information of the second terminal device may indicate whether the second terminal device is static or moving.

In an embodiment, the second connectivity related information may include: a serving network node of the second terminal device, an indication of whether the second terminal device requests or is capable of providing a relay path towards a network node or a terminal device, a list of identifiers of terminal devices that have been obtained in a previous discovery procedure, a radio quality indication of a PC5 or Uu link the second terminal device currently has, a load or a congestion condition of the PC5 or Uu link, a Radio Access Technology, RAT, of the PC5 or Uu link, an indication of a relay type the second terminal device requests or is capable of providing, or a number of hops or a maximum number of hops along a relay path the second terminal device requests or is capable of providing.

In an embodiment, the method may further include: obtaining a set of relay candidates, including the second terminal device, based at least on the second message; selecting, from the set of relay candidates, the second terminal device as a relay between the first terminal device and a network node or a third terminal device, based on the second application or traffic related information, the second location or mobility related information, and/or the second connectivity related information; and establishing a relay path from the first terminal device to the network node or the third terminal device via the second terminal device.

In an embodiment, the second message may further contain a second validity timer indicating a duration during which the information associated with the second terminal device is valid, and the operation of selecting may be based on the second validity timer.

In an embodiment, the method may further include: selecting, from the set of relay candidates, a fourth terminal device as a relay between the first terminal device and the network node or the third terminal device in response to a failure of the relay path, based on application or traffic related information, location or mobility related information, and/or connectivity related information associated with the fourth terminal device; and establishing a relay path from the first terminal device to the network node or the third terminal device via the fourth terminal device.

In an embodiment, the operation of selecting of the fourth terminal may be based on a validity timer indicating a duration during which the information associated with the fourth terminal device is valid.

In an embodiment, the method may further include: initiating another discovery procedure over the sidelink when all the relay candidates in the set have their respective validity timers expired.

In an embodiment, the first message may further contain a measurement configuration for the second terminal device to measure a PC5 link towards the third terminal device or a fifth terminal device, or a Uu link towards the network node, and the second message further contains a measurement report for the PC5 link or the Uu link.

In an embodiment, the method may further include: receiving the measurement configuration from a network node.

In an embodiment, the method may further include: receiving an authorization to initiate the discovery procedure from a network node.

In an embodiment, the first location or mobility related information and/or the first connectivity related information may be transmitted explicitly in one or more fields in the first message or included in a container in the first message.

In an embodiment, the second location or mobility related information and/or the second connectivity related information may be received explicitly in one or more fields in the second message or included in a container in the second message.

According to a second aspect of the present disclosure, a first terminal device is provided. The first terminal device includes a transmitting unit configured to transmit, to a second terminal device, a first message for initiating a discovery procedure over a sidelink. The first message contains one or more of following information associated with the first terminal device: first application or traffic related information, first location or mobility related information, or first connectivity related information.

The respective embodiments and features described above in connection with the first aspect also apply to the second aspect.

According to a third aspect of the present disclosure, a first terminal device is provided. The first terminal device includes a transceiver, a processor and a memory. The memory contains instructions executable by the processor whereby the first terminal device is operative to perform the method according to the above first aspect.

According to a fourth aspect of the present disclosure, a computer readable storage medium is provided. The computer readable storage medium has computer program instructions stored thereon. The computer program instructions, when executed by a processor in a first terminal device, cause the first terminal device to perform the method according to the above first aspect.

According to a fifth aspect of the present disclosure, a method in a second terminal device is provided. The method includes: receiving, from a first terminal device, a first message for initiating a discovery procedure over a sidelink. The first message contains one or more of following information associated with the first terminal device: first application or traffic related information, first location or mobility related information, or first connectivity related information.

In an embodiment, the first application or traffic related information may include a QoS profile of an application or traffic the first terminal device requests or is capable of providing.

In an embodiment, the QoS profile may include a type, a priority, and/or a QoS requirement of the application or traffic.

In an embodiment, the first location or mobility related information may include one or more of: location information of the first terminal device, information on an area or proximity where the first terminal device requests or is capable of providing an application or traffic, or mobility information of the first terminal device.

In an embodiment, the mobility information of the first terminal device may indicate whether the first terminal device is static or moving.

In an embodiment, the first connectivity related information may include: a serving network node of the first terminal device, an indication of whether the first terminal device requests or is capable of providing a relay path towards a network node or a terminal device, a list of identifiers of terminal devices that have been obtained in a previous discovery procedure, a radio quality indication of a PC5 or Uu link the first terminal device currently has, a load or a congestion condition of the PC5 or Uu link, an RAT of the PC5 or Uu link, an indication of a relay type the first terminal device requests or is capable of providing, or a number of hops or a maximum number of hops along a relay path the first terminal device requests or is capable of providing.

In an embodiment, the method may further include: obtaining a set of relay candidates, including the first terminal device, based at least on the first message; selecting, from the set of relay candidates, the first terminal device as a relay between the second terminal device and a network node or a third terminal device, based on the first application or traffic related information, the first location or mobility related information, and/or the first connectivity related information; and establishing a relay path from the second terminal device to the network node or the third terminal device via the first terminal device.

In an embodiment, the first message may further contain a first validity timer indicating a duration during which the information associated with the first terminal device is valid, and the operation of selecting may be based on the first validity timer.

In an embodiment, the method may further include: selecting, from the set of relay candidates, a fourth terminal device as a relay between the second terminal device and the network node or the third terminal device in response to a failure of the relay path, based on application or traffic related information, location or mobility related information, and/or connectivity related information associated with the fourth terminal device; and establishing a relay path from the second terminal device to the network node or the third terminal device via the fourth terminal device.

In an embodiment, the operation of selecting of the fourth terminal may be based on a validity timer indicating a duration during which the information associated with the fourth terminal device is valid.

In an embodiment, the method may further include: initiating another discovery procedure over the sidelink when all the relay candidates in the set have their respective validity timers expired.

In an embodiment, the method may further include: transmitting, to the first terminal device, a second message as a response to the first message. The second message may contain one or more of following information associated with the second terminal device: identifier information, second application or traffic related information, second location or mobility related information, or second connectivity related information.

In an embodiment, the second message may further contain a second validity timer indicating a duration during which the information associated with the second terminal device is valid.

In an embodiment, the identifier information may include one or more of: a global identifier of the second terminal device, a temporary identifier of the second terminal device, and/or an identifier of the second terminal device used only when the second terminal device serves as a relay for the first terminal device.

In an embodiment, the second application or traffic related information may include a QoS profile of an application or traffic the second terminal device requests or is capable of providing.

In an embodiment, the QoS profile may include a type, a priority, and/or a QoS requirement of the application or traffic the second terminal device requests or is capable of providing.

In an embodiment, the second location or mobility related information may include one or more of: location information of the second terminal device, information on an area or proximity where the second terminal device requests or is capable of providing an application or traffic, or mobility information of the second terminal device.

In an embodiment, the mobility information of the second terminal device may indicate whether the second terminal device is static or moving.

In an embodiment, the second connectivity related information may include: a serving network node of the second terminal device, an indication of whether the second terminal device requests or is capable of providing a relay path towards a network node or a terminal device, a list of identifiers of terminal devices that have been obtained in a previous discovery procedure, a radio quality indication of a PC5 or Uu link the second terminal device currently has, a load or a congestion condition of the PC5 or Uu link, an RAT of the PC5 or Uu link, an indication of a relay type the second terminal device requests or is capable of providing, or a number of hops or a maximum number of hops along a relay path the second terminal device requests or is capable of providing.

In an embodiment, the first message may further contain a measurement configuration for the second terminal device to measure a PC5 link towards the third terminal device or a fifth terminal device, or a Uu link towards the network node, and the second message further contains a measurement report for the PC5 link or the Uu link.

In an embodiment, the method may further include: receiving the measurement configuration from a network node.

In an embodiment, the method may further include: receiving an authorization to engage in the discovery procedure from a network node.

In an embodiment, the first location or mobility related information and/or the first connectivity related information may be received explicitly in one or more fields in the first message or included in a container in the first message.

In an embodiment, the second location or mobility related information and/or the second connectivity related information may be transmitted explicitly in one or more fields in the second message or included in a container in the second message.

According to a sixth aspect of the present disclosure, a second terminal device is provided. The second terminal device includes a receiving unit configured to receive, from a first terminal device, a first message for initiating a discovery procedure over a sidelink. The first message contains one or more of following information associated with the first terminal device: first application or traffic related information, first location or mobility related information, or first connectivity related information.

The respective embodiments and features described above in connection with the fifth aspect also apply to the sixth aspect.

According to a seventh aspect of the present disclosure, a second terminal device is provided. The second terminal device includes a transceiver, a processor and a memory. The memory contains instructions executable by the processor whereby the second terminal device is operative to perform the method according to the fifth aspect.

According to an eighth aspect of the present disclosure, a computer readable storage medium is provided. The computer readable storage medium has computer program instructions stored thereon. The computer program instructions, when executed by a processor in a second terminal device, cause the second terminal device to perform the method according to the fifth aspect.

According to a ninth aspect of the present disclosure, a method in a network node is provided. The method includes: transmitting, to a terminal device, an authorization to initiate or engage in a discovery procedure; and transmitting, to the terminal device, a measurement configuration for the terminal device to measure a PC5 link or a Uu link towards a network node or another terminal device.

In an embodiment, the authorization and/or the measurement configuration may be transmitted via a System Information Block (SIB) or Radio Resource Control (RRC) signaling.

According to a tenth aspect of the present disclosure, a network node is provided. The network device includes a transmitting unit configured to transmit, to a terminal device, an authorization to initiate or engage in a discovery procedure; and transmit, to the terminal device, a measurement configuration for the terminal device to measure a PC5 link or a Uu link towards a network node or another terminal device.

The respective embodiments and features described above in connection with the ninth aspect also apply to the tenth aspect.

According to an eleventh aspect of the present disclosure, a network node is provided. The network node includes a transceiver, a processor and a memory. The memory contains instructions executable by the processor whereby the network node is operative to perform the method according to the above ninth aspect.

According to a twelfth aspect of the present disclosure, a computer readable storage medium is provided. The computer readable storage medium has computer program instructions stored thereon. The computer program instructions, when executed by a processor in a network node, cause the network node to perform the method according to the above ninth aspect.

With the embodiments of the present disclosure, one or more messages in a discovery procedure can be enhanced with additional information. For example, a message for initiating a discovery procedure over a sidelink may contain application or traffic related information, location or mobility related information, and/or connectivity related information, associated with a terminal device transmitting the message. With such information, it is possible to improve the efficiency of the discovery procedure, especially for establishing a UE-to-Network or UE-to-UE relay path.

BRIEF DESCRIPTION OF THE DRAWINGS

The above and other objects, features and advantages will be more apparent from the following description of embodiments with reference to the figures, in which:

FIG. 3 is a flowchart illustrating a method in a first terminal device according to an embodiment of the present disclosure;

FIG. 4 is a flowchart illustrating a method in a second terminal device according to an embodiment of the present disclosure;

FIG. 5 is a flowchart illustrating a method in a network node according to an embodiment of the present disclosure;

FIGS. 14 to 17 are flowcharts illustrating methods implemented in a communication system including a host computer, a base station and a user equipment.

DETAILED DESCRIPTION

Figure 1:
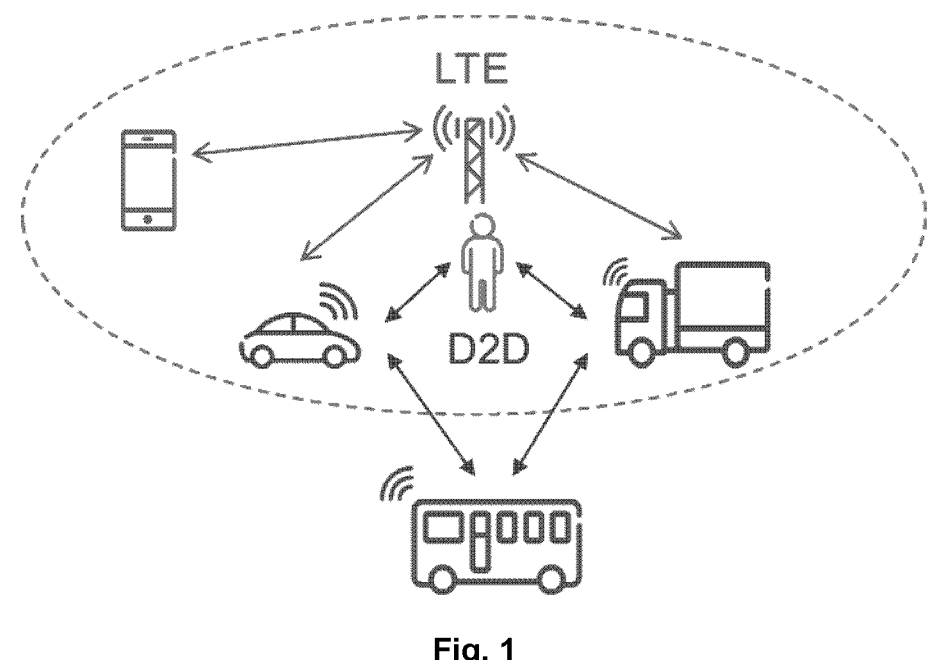
FIG. 1 is a schematic diagram showing V2X scenarios with an LTE based network infrastructure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network node in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network node refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network node to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 3 is a flowchart illustrating a method 300 according to an embodiment of the present disclosure. The method 300 can be performed at a first terminal device, which may be an announcing UE in Model A, or a discoverer UE in Model B. The first terminal device may initiate a discovery procedure with a second terminal device over a sidelink (or PC5 interface), so as to establish communication between the first and second terminal devices. The sidelink or PC5 communication can serve as a segment of a relay path between a Remote UE (referred to as "RM UE" hereinafter) and another entity (which can be a network node in case of UE-to-Network relay or another UE in case of UE-to-UE relay) via a Relay UE (referred to as "RL UE" hereinafter). In this case, the first terminal device can be the RM UE and the second terminal device can be the RL UE, or alternatively the first terminal device can be the RL UE and the second terminal device can be the RM UE.

Figure 2:
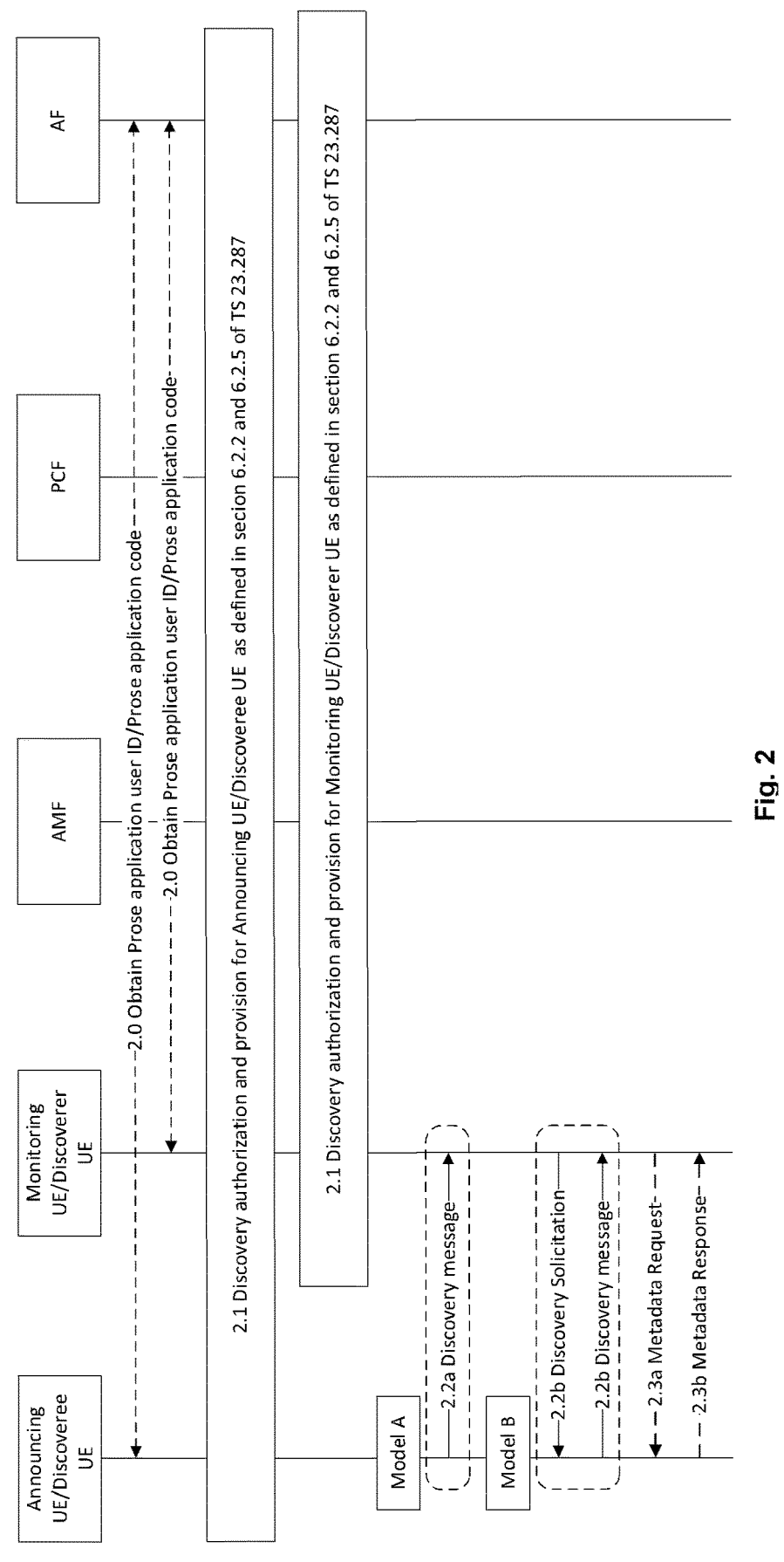
FIG. 2 is a schematic diagram showing an example of a discovery procedure.

At block 310, the first terminal device transmits, to the second terminal device, a first message for initiating a discovery procedure over a sidelink. Here, the first message can be e.g., the discovery message at 2.2*a* in FIG. 2, or the discovery solicitation at 2.2*b* in FIG. 2. In an example, before the block 310, the first terminal device may receive an authorization to initiate the discovery procedure from a network node, e.g., its serving gNB.

The first message contains one or more of following information associated with the first terminal device: first application or traffic related information, first location or mobility related information, or first connectivity related information. In addition, the first message may contain: 1) ProSe UE ID, e.g., ProSe application user ID, Layer 2 ID; 2) Group ID(s) provided by the application layer; and 3) Application ID(s) or ProSe application code(s) provided by the application layer, as described above.

In an example, the first message may further contain a first validity timer indicating a duration during which the information associated with the first terminal device is valid.

In an example, the first application or traffic related information may include a QoS profile of an application or traffic the first terminal device requests or is capable of providing. Here, the QoS profile may include a type, a priority, and/or a QoS requirement of the application or traffic.

In an example, the first location or mobility related information may include one or more of: location information (e.g., Global Positioning System (GPS) coordinates) of the first terminal device, information on an area or proximity where the first terminal device requests or is capable of providing an application or traffic, or mobility information of the first terminal device. Here, the mobility information of the first terminal device may indicate whether the first terminal device is static or moving, and/or a type of mobility, e.g., pedestrian or vehicle.

In an example, the first connectivity related information may include one or more of:
a serving network node of the first terminal device,
an indication of whether the first terminal device requests or is capable of providing a relay path towards a network node or a peer terminal device (e.g., an ID of the network node or the peer terminal device),
a list of IDs of terminal devices that have been obtained in a previous discovery procedure,
a radio quality indication of a PC5 or Uu link the first terminal device currently has,
a load or a congestion condition of the PC5 or Uu link,
an RAT (e.g., LTE or NR) of the PC5 or Uu link,
an indication of a relay type (e.g., UE-to-Network or UE-to-UE) the first terminal device requests or is capable of providing, or
a number of hops or a maximum number of hops along a relay path the first terminal device requests or is capable of providing.

Here, any of the above IDs can be a temporary ID used for the discovery procedure only, which becomes invalid once the discovery procedure is completed.

In an example, the Access Stratum (AS) configuration/information in the first message, e.g., the first location or mobility related information and/or the first connectivity related information, may be transmitted explicitly in one or more fields in the first message, or may be included in a container (e.g., OCTET STRING) in the first message. The container may function as a pointer to a part of e.g., an RRC specification where the AS configuration/information is standardized.

In an example, the first terminal device can receive, from the second terminal device, a second message as a response to the first message. Here, the second message can be e.g., a response (not shown) to the discovery message at 2.2*a* in FIG. 2, or the discovery message at 2.2*b* in FIG. 2.

The second message contains one or more of following information associated with the second terminal device: identifier information, second application or traffic related information, second location or mobility related information, or second connectivity related information.

In an example, the identifier information may include one or more of: a global identifier of the second terminal device, a temporary identifier of the second terminal device (e.g., used only for the discovery procedure), and/or an identifier of the second terminal device used only when the second terminal device serves as a relay for the first terminal device.

In an example, the second application or traffic related information may include a QoS profile of an application or traffic the second terminal device requests or is capable of providing. Here, the QoS profile may include a type, a priority, and/or a QoS requirement of the application or traffic the second terminal device requests or is capable of providing.

In an example, the second location or mobility related information may include one or more of: location information (e.g., GPS coordinates) of the second terminal device, information on an area or proximity where the second terminal device requests or is capable of providing an application or traffic, or mobility information of the second terminal device. Here, the mobility information of the second terminal device may indicate whether the second terminal device is static or moving, and/or a type of mobility, e.g., pedestrian or vehicle.

In an example, the second connectivity related information may include:

a serving network node of the second terminal device,
an indication of whether the second terminal device requests or is capable of providing a relay path towards a network node or a peer terminal device (e.g., an ID of the network node or the peer terminal device),
a list of IDs of terminal devices that have been obtained in a previous discovery procedure,
a radio quality indication of a PC5 or Uu link the second terminal device currently has,
a load or a congestion condition of the PC5 or Uu link,
an RAT (e.g., LTE or NR) of the PC5 or Uu link,
an indication of a relay type (e.g., UE-to-Network or UE-to-UE) the second terminal device requests or is capable of providing, or
a number of hops or a maximum number of hops along a relay path the second terminal device requests or is capable of providing.

In an example, the AS configuration/information in the second message, e.g., the second location or mobility related information and/or the second connectivity related information, may be received explicitly in one or more fields in the second message, or may be included in a container (e.g., OCTET STRING) in the second message. The container may function as a pointer to a part of e.g., an RRC specification where the AS configuration/information is standardized.

In an example where the first terminal device operates as an RM UE, it can obtain a set of relay candidates, including the second terminal device, based at least on the second message. For example, the first terminal device may obtain the set of relay candidates by receiving a message similar to the second message from each of the relay candidates. Next, the first terminal device can select, from the set of relay candidates, the second terminal device as a relay (RL UE) between the first terminal device and a network node or a peer terminal device (e.g., referred to as a third terminal device), based on the second application or traffic related information, the second location or mobility related information, and/or the second connectivity related information. Here, the first terminal device can sort the relay candidates in the set according to certain criteria and select the "best" relay candidate as the RL UE. For example, the first terminal device may select, as the RL UE, a relay candidate that is capable of providing a particular application or traffic it is interested in with a desired QoS in a particular area (e.g., a relay candidate that is connected to a network node or a peer terminal device capable of providing the particular application or traffic with the desired QoS in the particular area). The first terminal device may prioritize a relay candidate that is capable of providing a UE-to-Network relay over a relay candidate that is capable of providing a UE-to-UE relay. The first terminal device may prioritize a relay candidate that has a PC5 or Uu link with a better radio quality and/or a lower load over a relay candidate that has a PC5 or Uu link with a worse radio quality and/or a higher load. The first terminal device may prioritize a relay candidate that has an NR PC5 or Uu link over a relay candidate that has an LTE PC5 or Uu link. Then, the first terminal device can establish a relay path from the first terminal device to the network node or the third terminal device via the (selected) second terminal device.

In an example, the second message may further contain a second validity timer indicating a duration during which the information associated with the second terminal device is valid. The second terminal device can be selected as the RL UE based on the second validity timer, e.g., only when the second validity timer has not expired.

When the above establishment of the relay path succeeds, the discover procedure ends and the first terminal device can clear the set of relay candidates from its memory. Alternatively, the first terminal device can keep the set of relay candidates and remove a relay candidate from the set only when its associated validity timer expires, or the first terminal device can keep the set of relay candidates until a new discovery procedure is triggered.

When the above establishment of the relay path fails, the first terminal device can select another (e.g., the second best) relay candidate from the set as the RL UE and establish a relay path from the first terminal device to the network node or the third terminal device via the newly selected RL UE, if its associated validity timer has not expired. The first terminal device may try yet another relay candidate when the establishment fails again. If all the relay candidates in the set have been tried and the establishment keeps failing, a new discovery procedure can be initiated.

For example, when the established relay path fails, e.g., due to deterioration of the link quality between the first terminal device (RM UE) and the RL UE, the first terminal device can select, from the set of relay candidates, another terminal device (e.g., referred to as a fourth terminal device) as a relay (RL UE) between the first terminal device and the network node or the third terminal device in response to a failure of the relay path, based on application or traffic related information, location or mobility related information, and/or connectivity related information associated with the fourth terminal device. For example, the fourth terminal device can be selected based on a validity timer indicating a duration during which the information associated with the fourth terminal device is valid, e.g., when the validity timer has not expired. Then, the first terminal device can establish a relay path from the first terminal device to the network node or the third terminal device via the fourth terminal device.

In an example, the first terminal device may initiate another discovery procedure over the sidelink when all the relay candidates in the set have their respective validity timers expired.

In an example where the first terminal device operates as an RM UE, the first message may further contain a measurement configuration for the second terminal device (which is a relay candidate) to measure a PC5 link towards a peer terminal device (e.g., the above third terminal device or another terminal device), or a Uu link towards a network node. The measurement configuration may include e.g., time-frequency resources to measure and/or quantities to measure (for example, Reference Signal Received Power (RSRP), Reference Signal Received Quality (RSRQ), or Signal to Interference plus Noise Ratio (SINR)). The first terminal device may receive the measurement configuration from a network node, e.g., its serving gNB when it is in coverage, via SIB or dedicated RRC signaling. The second message may further contain a measurement report for the PC5 link or the Uu link, containing the quantities measured by the second terminal device according to the measurement report.

FIG. 4 is a flowchart illustrating a method 400 according to an embodiment of the present disclosure. The method 400 can be performed at a second terminal device, which may be a monitoring UE in Model A, or a discoveree UE in Model B. The second terminal device may respond to a discovery procedure initiated by a first terminal device over a sidelink (or PC5 interface), so as to establish communication between the first and second terminal devices. The sidelink or PC5 communication can serve as a segment of a relay path between an RM UE and another entity (which can be a network node in case of UE-to-Network relay or another UE in case of UE-to-UE relay) via an RL UE. In this case, the first terminal device can be the RM UE and the second terminal device can be the RL UE, or alternatively the first terminal device can be the RL UE and the second terminal device can be the RM UE.

At block 410, the second terminal device receives, from the first terminal device, a first message for initiating a discovery procedure over a sidelink. Here, the first message can be e.g., the discovery message at 2.2a in FIG. 2, or the discovery solicitation at 2.2b in FIG. 2.

The first message contains one or more of following information associated with the first terminal device: first application or traffic related information, first location or mobility related information, or first connectivity related information. In addition, the first message may contain: 1) ProSe UE ID, e.g., ProSe application user ID, Layer 2 ID; 2) Group ID(s) provided by the application layer; and 3) Application ID(s) or ProSe application code(s) provided by the application layer, as described above.

In an example, the first application or traffic related information may include a QoS profile of an application or traffic the first terminal device requests or is capable of providing. Here, the QoS profile may include a type, a priority, and/or a QoS requirement of the application or traffic.

In an example, the first location or mobility related information may include one or more of: location information (e.g., GPS coordinates) of the first terminal device, information on an area or proximity where the first terminal device requests or is capable of providing an application or traffic, or mobility information of the first terminal device. Here, the mobility information of the first terminal device may indicate whether the first terminal device is static or moving, and/or a type of mobility, e.g., pedestrian or vehicle.

In an example, the first connectivity related information may include one or more of:

a serving network node of the first terminal device, an indication of whether the first terminal device requests or is capable of providing a relay path towards a network node or a peer terminal device (e.g., an ID of the network node or the peer terminal device), a list of IDs of terminal devices that have been obtained in a previous discovery procedure, a radio quality indication of a PC5 or Uu link the first terminal device currently has, a load or a congestion condition of the PC5 or Uu link, an RAT (e.g., LTE or NR) of the PC5 or Uu link, an indication of a relay type (e.g., UE-to-Network or UE-to-UE) the first terminal device requests or is capable of providing, or a number of hops or a maximum number of hops along a relay path the first terminal device requests or is capable of providing.

Here, any of the above IDs can be a temporary ID used for the discovery procedure only, which becomes invalid once the discovery procedure is completed.

In an example, the AS configuration/information in the first message, e.g., the first location or mobility related information and/or the first connectivity related information, may be received explicitly in one or more fields in the first message, or may be included in a container (e.g., OCTET STRING) in the first message. The container may function as a pointer to a part of e.g., an RRC specification where the AS configuration/information is standardized.

In an example where the second terminal device operates as an RM UE, it can obtain a set of relay candidates, including the first terminal device, based at least on the first message. For example, the second terminal device may obtain the set of relay candidates by receiving a message similar to the first message from each of the relay candidates. Next, the second terminal device can select, from the set of relay candidates, the first terminal device as a relay (RL UE) between the second terminal device and a network node or a peer terminal device (e.g., referred to as a third terminal device), based on the first application or traffic related information, the first location or mobility related information, and/or the first connectivity related information. Here, the second terminal device can sort the relay candidates in the set according to certain criteria and select the "best" relay candidate as the RL UE. For example, the second terminal device may select, as the RL UE, a relay candidate that is capable of providing a particular application or traffic it is interested in with a desired QoS in a particular area (e.g., a relay candidate that is connected to a network node or a peer terminal device capable of providing the particular application or traffic with the desired QoS in the particular area). The second terminal device may prioritize a relay candidate that is capable of providing a UE-to-Network relay over a relay candidate that is capable of providing a UE-to-UE relay. The second terminal device may prioritize a relay candidate that has a PC5 or Uu link with a better radio quality and/or a lower load over a relay candidate that has a PC5 or Uu link with a worse radio quality and/or a higher load. The second terminal device may prioritize a relay candidate that has an NR PC5 or Uu link over a relay candidate that has an LTE PC5 or Uu link. Then, the second terminal device can establish a relay path from the second terminal device to the network node or the third terminal device via the (selected) first terminal device.

In an example, the first message may further contain a first validity timer indicating a duration during which the information associated with the first terminal device is valid. The first terminal device can be selected as the RL UE based on the second validity timer, e.g., only when the first validity timer has not expired.

When the above establishment of the relay path succeeds, the discover procedure ends and the second terminal device can clear the set of relay candidates from its memory. Alternatively, the second terminal device can keep the set of relay candidates and remove a relay candidate from the set only when its associated validity timer expires, or the second terminal device can keep the set of relay candidates until a new discovery procedure is triggered.

When the above establishment of the relay path fails, the second terminal device can select another (e.g., the second best) relay candidate from the set as the RL UE and establish a relay path from the second terminal device to the network node or the third terminal device via the newly selected RL UE, if its associated validity timer has not expired. The second terminal device may try yet another relay candidate when the establishment fails again. If all the relay candidates in the set have been tried and the establishment keeps failing, a new discovery procedure can be initiated.

For example, when the established relay path fails, e.g., due to deterioration of the link quality between the second terminal device (RM UE) and the RL UE, the second terminal device can select, from the set of relay candidates, another terminal device (e.g., referred to as a fourth terminal device) as a relay (RL UE) between the second terminal device and the network node or the third terminal device in response to a failure of the relay path, based on application or traffic related information, location or mobility related information, and/or connectivity related information associated with the fourth terminal device. For example, the fourth terminal device can be selected based on a validity timer indicating a duration during which the information associated with the fourth terminal device is valid, e.g., when the validity timer has not expired. Then, the second terminal device can establish a relay path from the second terminal device to the network node or the third terminal device via the fourth terminal device.

In an example, the second terminal device may initiate another discovery procedure over the sidelink when all the relay candidates in the set have their respective validity timers expired.

In an example, the second terminal device may transmit, to the first terminal device, a second message as a response to the first message. Here, the second message can be e.g., a response (not shown) to the discovery message at 2.2*a* in FIG. 2, or the discovery message at 2.2*b* in FIG. 2.

The second message contains one or more of following information associated with the second terminal device: identifier information, second application or traffic related information, second location or mobility related information, or second connectivity related information. In an example, before transmitting the second message, the second terminal device may receive an authorization to engage in the discovery procedure (e.g., by responding to the first message) from a network node, e.g., its serving gNB.

In an example, the second message may further contain a second validity timer indicating a duration during which the information associated with the second terminal device is valid.

In an example, the identifier information may include one or more of: a global identifier of the second terminal device, a temporary identifier of the second terminal device (e.g., used only for the discovery procedure), and/or an identifier of the second terminal device used only when the second terminal device serves as a relay for the first terminal device.

In an example, the second application or traffic related information may include a QoS profile of an application or traffic the second terminal device requests or is capable of providing. Here, the QoS profile may include a type, a priority, and/or a QoS requirement of the application or traffic the second terminal device requests or is capable of providing.

In an example, the second location or mobility related information may include one or more of: location information (e.g., GPS coordinates) of the second terminal device, information on an area or proximity where the second terminal device requests or is capable of providing an application or traffic, or mobility information of the second terminal device. Here, the mobility information of the second terminal device may indicate whether the second terminal device is static or moving, and/or a type of mobility, e.g., pedestrian or vehicle.

In an example, the second connectivity related information may include:

a serving network node of the second terminal device, an indication of whether the second terminal device requests or is capable of providing a relay path towards a network node or a peer terminal device (e.g., an ID of the network node or the peer terminal device), a list of IDs of terminal devices that have been obtained in a previous discovery procedure, a radio quality indication of a PC5 or Uu link the second terminal device currently has, a load or a congestion condition of the PC5 or Uu link, an RAT (e.g., LTE or NR) of the PC5 or Uu link, an indication of a relay type (e.g., UE-to-Network or UE-to-UE) the second terminal device requests or is capable of providing, or a number of hops or a maximum number of hops along a relay path the second terminal device requests or is capable of providing.

In an example, the AS configuration/information in the second message, e.g., the second location or mobility related information and/or the second connectivity related information, may be transmitted explicitly in one or more fields in the second message, or may be included in a container (e.g., OCTET STRING) in the second message. The container may function as a pointer to a part of e.g., an RRC specification where the AS configuration/information is standardized.

In an example where the first terminal device operates as an RM UE, the first message may further contain a measurement configuration for the second terminal device (which is a relay candidate) to measure a PC5 link towards a peer terminal device (e.g., the above third terminal device or another terminal device), or a Uu link towards a network node. The measurement configuration may include e.g., time-frequency resources to measure and/or quantities to measure (for example, RSRP, RSRQ, or SINR). The second terminal device may also receive a measurement configuration from a network node, e.g., its serving gNB, via SIB or dedicated RRC signaling. The second terminal device can perform measurement on the PC5 link or the Uu link using the measurement configuration from the first terminal device or using the measurement configuration from the network node or using a predefined measurement configuration. The second message may further contain a measurement report for the PC5 link or the Uu link, containing the quantities measured by the second terminal device according to the measurement report.

FIG. 5 is a flowchart illustrating a method 500 according to an embodiment of the present disclosure. The method 500 can be performed at a network node, e.g., a serving network node of the above first or second terminal device.

At block 510, the network node transmits, to a terminal device (e.g., the above first or second terminal device), an authorization to initiate or engage in a discovery procedure.

At block 520, the network node transmits, to the terminal device, a measurement configuration for the terminal device to measure a PC5 link or a Uu link towards a network node or another (peer) terminal device.

In an example, the authorization and/or the measurement configuration may be transmitted via SIB or (dedicated) RRC signaling.

Figure 6:
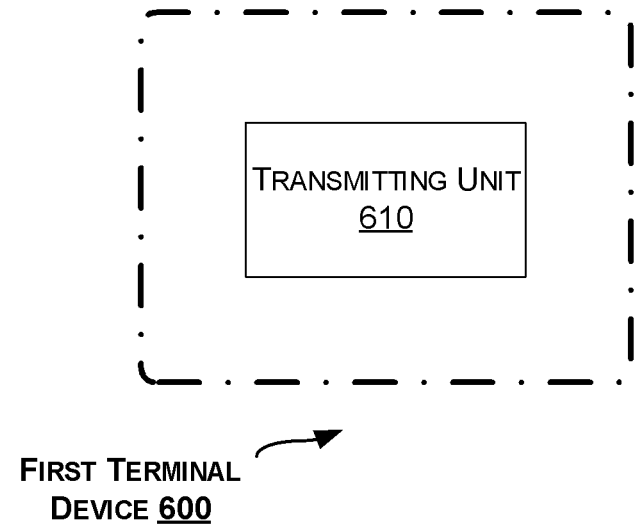
FIG. 6 is a block diagram of a first terminal device according to an embodiment of the present disclosure.

Correspondingly to the method 300 as described above, a first terminal device is provided. FIG. 6 is a block diagram of a first terminal device 600 according to an embodiment of the present disclosure. The first terminal device 600 can be e.g., an announcing UE in Model A, or a discoverer UE in Model B. The first terminal device 600 may function as an RM UE or an RL UE.

The first terminal device 600 can be configured to perform the method 300 as described above in connection with FIG. 3. As shown in FIG. 6, the first terminal device 600 includes a transmitting unit 610 configured to transmit, to a second terminal device, a first message for initiating a discovery procedure over a sidelink. The first message contains one or more of following information associated with the first terminal device: first application or traffic related information, first location or mobility related information, or first connectivity related information.

In an embodiment, the first message may further contain a first validity timer indicating a duration during which the information associated with the first terminal device is valid.

In an embodiment, the first application or traffic related information may include a Quality of Service (QoS) profile of an application or traffic the first terminal device requests or is capable of providing.

In an embodiment, the QoS profile may include a type, a priority, and/or a QoS requirement of the application or traffic.

In an embodiment, the first location or mobility related information may include one or more of: location information of the first terminal device, information on an area or proximity where the first terminal device requests or is capable of providing an application or traffic, or mobility information of the first terminal device.

In an embodiment, the mobility information of the first terminal device may indicate whether the first terminal device is static or moving.

In an embodiment, the first connectivity related information may include: a serving network node of the first terminal device, an indication of whether the first terminal device requests or is capable of providing a relay path towards a network node or a terminal device, a list of identifiers of terminal devices that have been obtained in a previous discovery procedure, a radio quality indication of a PC5 or Uu link the first terminal device currently has, a load or a congestion condition of the PC5 or Uu link, a Radio Access Technology (RAT) of the PC5 or Uu link, an indication of a relay type the first terminal device requests or is capable of providing, or a number of hops or a maximum number of hops along a relay path the first terminal device requests or is capable of providing.

In an embodiment, the first terminal device 600 may further include a receiving unit configured to receive, from the second terminal device, a second message as a response to the first message. The second message contains one or more of following information associated with the second terminal device: identifier information, second application or traffic related information, second location or mobility related information, or second connectivity related information.

In an embodiment, the identifier information may include one or more of: a global identifier of the second terminal device, a temporary identifier of the second terminal device, and/or an identifier of the second terminal device used only when the second terminal device serves as a relay for the first terminal device.

In an embodiment, the second application or traffic related information may include a QoS profile of an application or traffic the second terminal device requests or is capable of providing.

In an embodiment, the QoS profile may include a type, a priority, and/or a QoS requirement of the application or traffic the second terminal device requests or is capable of providing.

In an embodiment, the second location or mobility related information may include one or more of: location information of the second terminal device, information on an area or proximity where the second terminal device requests or is capable of providing an application or traffic, or mobility information of the second terminal device.

In an embodiment, the mobility information of the second terminal device may indicate whether the second terminal device is static or moving.

In an embodiment, the second connectivity related information may include: a serving network node of the second terminal device, an indication of whether the second terminal device requests or is capable of providing a relay path towards a network node or a terminal device, a list of identifiers of terminal devices that have been obtained in a previous discovery procedure, a radio quality indication of a PC5 or Uu link the second terminal device currently has, a load or a congestion condition of the PC5 or Uu link, a Radio Access Technology, RAT, of the PC5 or Uu link, an indication of a relay type the second terminal device requests or is capable of providing, or a number of hops or a maximum number of hops along a relay path the second terminal device requests or is capable of providing.

In an embodiment, the first terminal device 600 may further include: an obtaining unit configured to obtain a set of relay candidates, including the second terminal device, based at least on the second message; a selecting unit configured to select, from the set of relay candidates, the second terminal device as a relay between the first terminal device and a network node or a third terminal device, based on the second application or traffic related information, the second location or mobility related information, and/or the second connectivity related information; and an establishing unit configured to establish a relay path from the first terminal device to the network node or the third terminal device via the second terminal device.

In an embodiment, the second message may further contain a second validity timer indicating a duration during which the information associated with the second terminal device is valid, and the second terminal device may be selected based on the second validity timer.

In an embodiment, the selecting unit may be further configured to select, from the set of relay candidates, a fourth terminal device as a relay between the first terminal device and the network node or the third terminal device in response to a failure of the relay path, based on application or traffic related information, location or mobility related information, and/or connectivity related information associated with the fourth terminal device. The establishing unit may be further configured to establish a relay path from the first terminal device to the network node or the third terminal device via the fourth terminal device.

In an embodiment, the fourth terminal may be selected based on a validity timer indicating a duration during which the information associated with the fourth terminal device is valid.

In an embodiment, the first terminal device 600 may further include an initiating unit configured to initiate another discovery procedure over the sidelink when all the relay candidates in the set have their respective validity timers expired.

In an embodiment, the first message may further contain a measurement configuration for the second terminal device to measure a PC5 link towards the third terminal device or a fifth terminal device, or a Uu link towards the network node, and the second message further contains a measurement report for the PC5 link or the Uu link.

In an embodiment, the first terminal device 600 may further include a receiving unit configured to receive the measurement configuration from a network node.

In an embodiment, the first terminal device 600 may further include a receiving unit configured to receive an authorization to initiate the discovery procedure from a network node.

In an embodiment, the first location or mobility related information and/or the first connectivity related information may be transmitted explicitly in one or more fields in the first message or included in a container in the first message.

In an embodiment, the second location or mobility related information and/or the second connectivity related information may be received explicitly in one or more fields in the second message or included in a container in the second message.

The above unit 610 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 7:
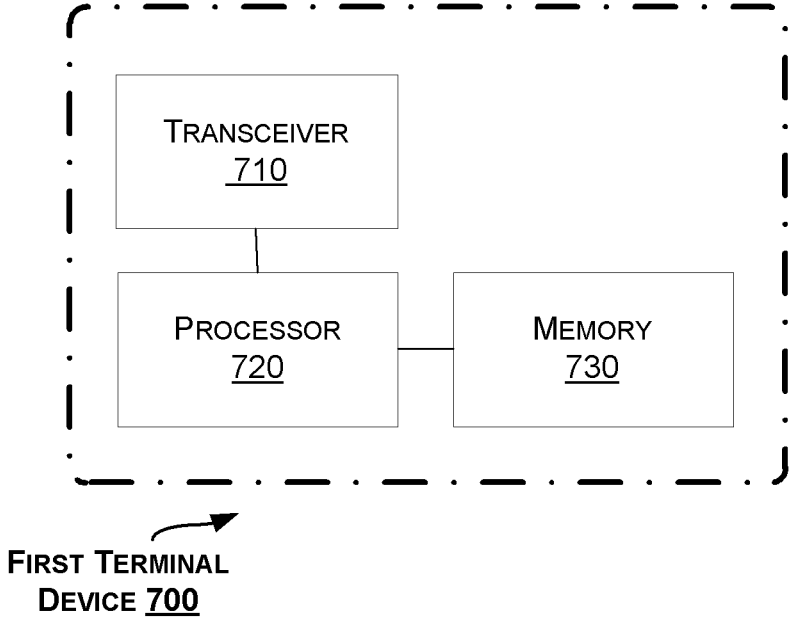
FIG. 7 is a block diagram of a first terminal device according to another embodiment of the present disclosure.

FIG. 7 is a block diagram of a first terminal device 700 according to another embodiment of the present disclosure. The first terminal device 700 can be e.g., an announcing UE in Model A, or a discoverer UE in Model B. The first terminal device 700 may function as an RM UE or an RL UE.

The first terminal device 700 includes a transceiver 710, a processor 720 and a memory 730. The memory 730 contains instructions executable by the processor 720 whereby the first terminal device 700 is operative to perform the actions, e.g., of the procedure described earlier in conjunction with FIG. 3. Particularly, the memory 730 can contain instructions executable by the processor 720 whereby the first terminal device 700 is operative to: transmit, to a second terminal device, a first message for initiating a discovery procedure over a sidelink. The first message contains one or more of following information associated with the first terminal device: first application or traffic related information, first location or mobility related information, or first connectivity related information.

In an embodiment, the first message may further contain a first validity timer indicating a duration during which the information associated with the first terminal device is valid.

In an embodiment, the first application or traffic related information may include a Quality of Service (QoS) profile of an application or traffic the first terminal device requests or is capable of providing.

In an embodiment, the QoS profile may include a type, a priority, and/or a QoS requirement of the application or traffic.

In an embodiment, the first location or mobility related information may include one or more of: location information of the first terminal device, information on an area or proximity where the first terminal device requests or is capable of providing an application or traffic, or mobility information of the first terminal device.

In an embodiment, the mobility information of the first terminal device may indicate whether the first terminal device is static or moving.

In an embodiment, the first connectivity related information may include: a serving network node of the first terminal device, an indication of whether the first terminal device requests or is capable of providing a relay path towards a network node or a terminal device, a list of identifiers of terminal devices that have been obtained in a previous discovery procedure, a radio quality indication of a PC5 or Uu link the first terminal device currently has, a load or a congestion condition of the PC5 or Uu link, a Radio Access Technology (RAT) of the PC5 or Uu link, an indication of a relay type the first terminal device requests or is capable of providing, or a number of hops or a maximum number of hops along a relay path the first terminal device requests or is capable of providing.

In an embodiment, the memory 730 may further contain instructions executable by the processor 720 whereby the first terminal device 700 is operative to: receive, from the second terminal device, a second message as a response to the first message. The second message contains one or more of following information associated with the second terminal device: identifier information, second application or traffic related information, second location or mobility related information, or second connectivity related information.

In an embodiment, the identifier information may include one or more of: a global identifier of the second terminal device, a temporary identifier of the second terminal device, and/or an identifier of the second terminal device used only when the second terminal device serves as a relay for the first terminal device.

In an embodiment, the second application or traffic related information may include a QoS profile of an application or traffic the second terminal device requests or is capable of providing.

In an embodiment, the QoS profile may include a type, a priority, and/or a QoS requirement of the application or traffic the second terminal device requests or is capable of providing.

In an embodiment, the second location or mobility related information may include one or more of: location information of the second terminal device, information on an area or proximity where the second terminal device requests or is capable of providing an application or traffic, or mobility information of the second terminal device.

In an embodiment, the mobility information of the second terminal device may indicate whether the second terminal device is static or moving.

In an embodiment, the second connectivity related information may include: a serving network node of the second terminal device, an indication of whether the second terminal device requests or is capable of providing a relay path towards a network node or a terminal device, a list of identifiers of terminal devices that have been obtained in a previous discovery procedure, a radio quality indication of a PC5 or Uu link the second terminal device currently has, a load or a congestion condition of the PC5 or Uu link, a Radio Access Technology, RAT, of the PC5 or Uu link, an indication of a relay type the second terminal device requests or is capable of providing, or a number of hops or a maximum number of hops along a relay path the second terminal device requests or is capable of providing.

In an embodiment, the memory 730 may further contain instructions executable by the processor 720 whereby the first terminal device 700 is operative to: obtain a set of relay candidates, including the second terminal device, based at least on the second message; select, from the set of relay candidates, the second terminal device as a relay between the first terminal device and a network node or a third terminal device, based on the second application or traffic related information, the second location or mobility related information, and/or the second connectivity related information; and establish a relay path from the first terminal device to the network node or the third terminal device via the second terminal device.

In an embodiment, the second message may further contain a second validity timer indicating a duration during which the information associated with the second terminal device is valid, and the operation of selecting may be based on the second validity timer.

In an embodiment, the memory 730 may further contain instructions executable by the processor 720 whereby the first terminal device 700 is operative to: select, from the set of relay candidates, a fourth terminal device as a relay between the first terminal device and the network node or the third terminal device in response to a failure of the relay path, based on application or traffic related information, location or mobility related information, and/or connectivity related information associated with the fourth terminal device; and establish a relay path from the first terminal device to the network node or the third terminal device via the fourth terminal device.

In an embodiment, the operation of selecting of the fourth terminal may be based on a validity timer indicating a duration during which the information associated with the fourth terminal device is valid.

In an embodiment, the method may further include: initiating another discovery procedure over the sidelink when all the relay candidates in the set have their respective validity timers expired.

In an embodiment, the first message may further contain a measurement configuration for the second terminal device to measure a PC5 link towards the third terminal device or a fifth terminal device, or a Uu link towards the network node, and the second message further contains a measurement report for the PC5 link or the Uu link.

In an embodiment, the memory 730 may further contain instructions executable by the processor 720 whereby the first terminal device 700 is operative to: receive the measurement configuration from a network node.

In an embodiment, the memory 730 may further contain instructions executable by the processor 720 whereby the first terminal device 700 is operative to: receive an authorization to initiate the discovery procedure from a network node.

In an embodiment, the first location or mobility related information and/or the first connectivity related information may be transmitted explicitly in one or more fields in the first message or included in a container in the first message.

In an embodiment, the second location or mobility related information and/or the second connectivity related information may be received explicitly in one or more fields in the second message or included in a container in the second message.

Figure 8:
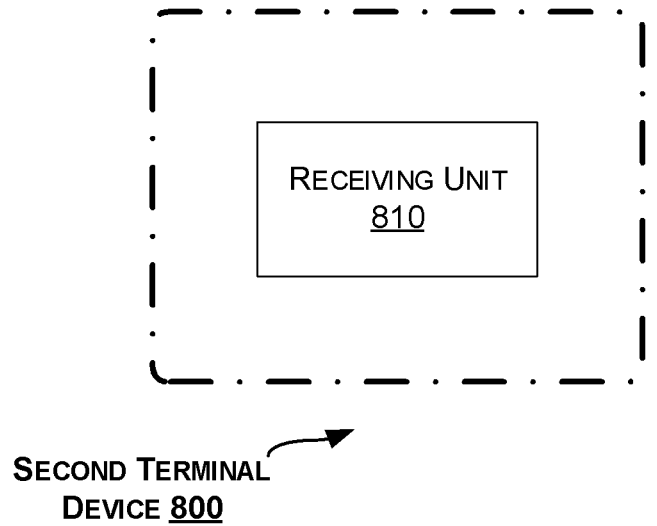
FIG. 8 is a block diagram of a second terminal device according to an embodiment of the present disclosure.

Correspondingly to the method 400 as described above, a second terminal device is provided. FIG. 8 is a block diagram of a second terminal device 800 according to an embodiment of the present disclosure. The second terminal device 800 can be e.g., a monitoring UE in Model A, or a discoveree UE in Model B. The second terminal device 800 may function as an RM UE or an RL UE.

The second terminal device 800 can be configured to perform the method 400 as described above in connection with FIG. 4. As shown in FIG. 8, the second terminal device 800 includes a receiving unit 810 configured to receive, from a first terminal device, a first message for initiating a discovery procedure over a sidelink. The first message contains one or more of following information associated with the first terminal device: first application or traffic related information, first location or mobility related information, or first connectivity related information.

In an embodiment, the first application or traffic related information may include a QoS profile of an application or traffic the first terminal device requests or is capable of providing.

In an embodiment, the QoS profile may include a type, a priority, and/or a QoS requirement of the application or traffic.

In an embodiment, the first location or mobility related information may include one or more of: location information of the first terminal device, information on an area or proximity where the first terminal device requests or is capable of providing an application or traffic, or mobility information of the first terminal device.

In an embodiment, the mobility information of the first terminal device may indicate whether the first terminal device is static or moving.

In an embodiment, the first connectivity related information may include: a serving network node of the first terminal device, an indication of whether the first terminal device requests or is capable of providing a relay path towards a network node or a terminal device, a list of identifiers of terminal devices that have been obtained in a previous discovery procedure, a radio quality indication of a PC5 or Uu link the first terminal device currently has, a load or a congestion condition of the PC5 or Uu link, an RAT of the PC5 or Uu link, an indication of a relay type the first terminal device requests or is capable of providing, or a number of hops or a maximum number of hops along a relay path the first terminal device requests or is capable of providing.

In an embodiment, the second terminal device 800 may further include: an obtaining unit configured to obtain a set of relay candidates, including the first terminal device, based at least on the first message; a selecting unit configured to select, from the set of relay candidates, the first terminal device as a relay between the second terminal device and a network node or a third terminal device, based on the first application or traffic related information, the first location or mobility related information, and/or the first connectivity related information; and an establishing unit configured to establish a relay path from the second terminal device to the network node or the third terminal device via the first terminal device.

In an embodiment, the first message may further contain a first validity timer indicating a duration during which the information associated with the first terminal device is valid, and the first terminal device may be selected based on the first validity timer.

In an embodiment, the selecting unit may be further configured to select, from the set of relay candidates, a fourth terminal device as a relay between the second terminal device and the network node or the third terminal device in response to a failure of the relay path, based on application or traffic related information, location or mobility related information, and/or connectivity related information associated with the fourth terminal device. The establishing unit may be further configured to establish a relay path from the second terminal device to the network node or the third terminal device via the fourth terminal device.

In an embodiment, the fourth terminal may be selected based on a validity timer indicating a duration during which the information associated with the fourth terminal device is valid.

In an embodiment, the second terminal device 800 may further include an initiating unit configured to initiate another discovery procedure over the sidelink when all the relay candidates in the set have their respective validity timers expired.

In an embodiment, the second terminal device 800 may further include a transmitting unit configured to transmit, to the first terminal device, a second message as a response to the first message. The second message may contain one or more of following information associated with the second terminal device: identifier information, second application or traffic related information, second location or mobility related information, or second connectivity related information.

In an embodiment, the second message may further contain a second validity timer indicating a duration during which the information associated with the second terminal device is valid.

In an embodiment, the identifier information may include one or more of: a global identifier of the second terminal device, a temporary identifier of the second terminal device, and/or an identifier of the second terminal device used only when the second terminal device serves as a relay for the first terminal device.

In an embodiment, the second application or traffic related information may include a QoS profile of an application or traffic the second terminal device requests or is capable of providing.

In an embodiment, the QoS profile may include a type, a priority, and/or a QoS requirement of the application or traffic the second terminal device requests or is capable of providing.

In an embodiment, the second location or mobility related information may include one or more of: location information of the second terminal device, information on an area or proximity where the second terminal device requests or is capable of providing an application or traffic, or mobility information of the second terminal device.

In an embodiment, the mobility information of the second terminal device may indicate whether the second terminal device is static or moving.

In an embodiment, the second connectivity related information may include: a serving network node of the second terminal device, an indication of whether the second terminal device requests or is capable of providing a relay path towards a network node or a terminal device, a list of identifiers of terminal devices that have been obtained in a previous discovery procedure, a radio quality indication of a PC5 or Uu link the second terminal device currently has, a load or a congestion condition of the PC5 or Uu link, an RAT of the PC5 or Uu link, an indication of a relay type the second terminal device requests or is capable of providing, or a number of hops or a maximum number of hops along a relay path the second terminal device requests or is capable of providing.

In an embodiment, the first message may further contain a measurement configuration for the second terminal device to measure a PC5 link towards the third terminal device or a fifth terminal device, or a Uu link towards the network node, and the second message further contains a measurement report for the PC5 link or the Uu link.

In an embodiment, the receiving unit 810 may be further configured to receive the measurement configuration from a network node.

In an embodiment, the receiving unit 810 may be further configured to receive an authorization to engage in the discovery procedure from a network node.

In an embodiment, the first location or mobility related information and/or the first connectivity related information may be received explicitly in one or more fields in the first message or included in a container in the first message.

In an embodiment, the second location or mobility related information and/or the second connectivity related information may be transmitted explicitly in one or more fields in the second message or included in a container in the second message.

The above unit 810 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 9:
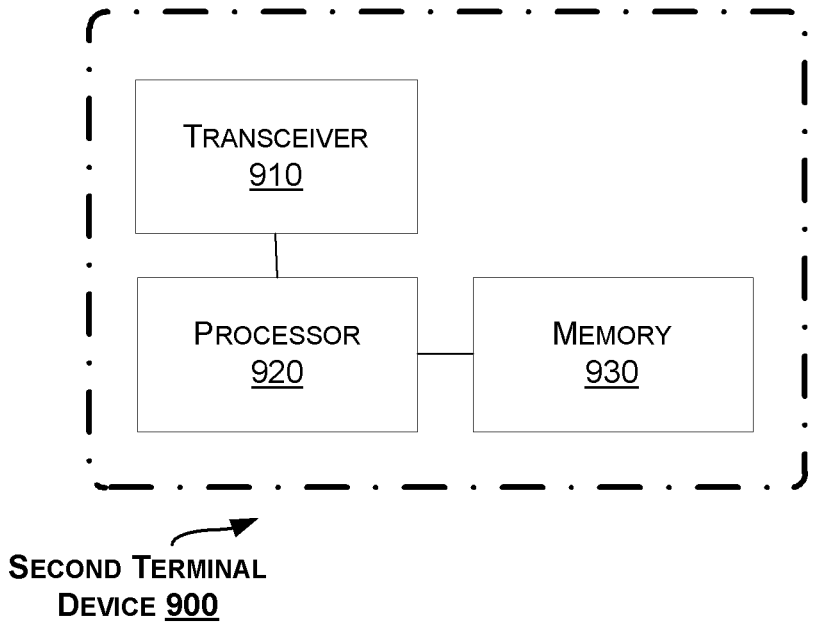
FIG. 9 is a block diagram of a second terminal device according to another embodiment of the present disclosure.

FIG. 9 is a block diagram of a second terminal device 900 according to another embodiment of the present disclosure. The second terminal device 900 can be e.g., a monitoring UE in Model A, or a discoveree UE in Model B. The second terminal device 900 may function as an RM UE or an RL UE.

The second terminal device 900 includes a transceiver 910, a processor 920 and a memory 930. The memory 930 contains instructions executable by the processor 920 whereby the second terminal device 900 is operative to perform the actions, e.g., of the procedure described earlier in conjunction with FIG. 4. Particularly, the memory 930 can contain instructions executable by the processor 920 whereby the second terminal device 900 is operative to: receive, from a first terminal device, a first message for initiating a discovery procedure over a sidelink. The first message contains one or more of following information associated with the first terminal device: first application or traffic related information, first location or mobility related information, or first connectivity related information.

In an embodiment, the first application or traffic related information may include a QoS profile of an application or traffic the first terminal device requests or is capable of providing.

In an embodiment, the QoS profile may include a type, a priority, and/or a QoS requirement of the application or traffic.

In an embodiment, the first location or mobility related information may include one or more of: location information of the first terminal device, information on an area or proximity where the first terminal device requests or is capable of providing an application or traffic, or mobility information of the first terminal device.

In an embodiment, the mobility information of the first terminal device may indicate whether the first terminal device is static or moving.

In an embodiment, the first connectivity related information may include: a serving network node of the first terminal device, an indication of whether the first terminal device requests or is capable of providing a relay path towards a network node or a terminal device, a list of identifiers of terminal devices that have been obtained in a previous discovery procedure, a radio quality indication of a PC5 or Uu link the first terminal device currently has, a load or a congestion condition of the PC5 or Uu link, an RAT of the PC5 or Uu link, an indication of a relay type the first terminal device requests or is capable of providing, or a number of hops or a maximum number of hops along a relay path the first terminal device requests or is capable of providing.

In an embodiment, the memory 930 may further contain instructions executable by the processor 920 whereby the second terminal device 900 is operative to: obtain a set of relay candidates, including the first terminal device, based at least on the first message; select, from the set of relay candidates, the first terminal device as a relay between the second terminal device and a network node or a third terminal device, based on the first application or traffic related information, the first location or mobility related information, and/or the first connectivity related information; and establish a relay path from the second terminal device to the network node or the third terminal device via the first terminal device.

In an embodiment, the first message may further contain a first validity timer indicating a duration during which the information associated with the first terminal device is valid, and the operation of selecting may be based on the first validity timer.

In an embodiment, the memory 930 may further contain instructions executable by the processor 920 whereby the second terminal device 900 is operative to: select, from the set of relay candidates, a fourth terminal device as a relay between the second terminal device and the network node or the third terminal device in response to a failure of the relay path, based on application or traffic related information, location or mobility related information, and/or connectivity related information associated with the fourth terminal device; and establish a relay path from the second terminal device to the network node or the third terminal device via the fourth terminal device.

In an embodiment, the operation of selecting of the fourth terminal may be based on a validity timer indicating a duration during which the information associated with the fourth terminal device is valid.

In an embodiment, the memory 930 may further contain instructions executable by the processor 920 whereby the second terminal device 900 is operative to: initiate another discovery procedure over the sidelink when all the relay candidates in the set have their respective validity timers expired.

In an embodiment, the memory 930 may further contain instructions executable by the processor 920 whereby the second terminal device 900 is operative to: transmit, to the first terminal device, a second message as a response to the first message. The second message may contain one or more of following information associated with the second terminal device: identifier information, second application or traffic related information, second location or mobility related information, or second connectivity related information.

In an embodiment, the second message may further contain a second validity timer indicating a duration during which the information associated with the second terminal device is valid.

In an embodiment, the identifier information may include one or more of: a global identifier of the second terminal device, a temporary identifier of the second terminal device, and/or an identifier of the second terminal device used only when the second terminal device serves as a relay for the first terminal device.

In an embodiment, the second application or traffic related information may include a QoS profile of an application or traffic the second terminal device requests or is capable of providing.

In an embodiment, the QoS profile may include a type, a priority, and/or a QoS requirement of the application or traffic the second terminal device requests or is capable of providing.

In an embodiment, the second location or mobility related information may include one or more of: location information of the second terminal device, information on an area or proximity where the second terminal device requests or is capable of providing an application or traffic, or mobility information of the second terminal device.

In an embodiment, the mobility information of the second terminal device may indicate whether the second terminal device is static or moving.

In an embodiment, the second connectivity related information may include: a serving network node of the second terminal device, an indication of whether the second terminal device requests or is capable of providing a relay path towards a network node or a terminal device, a list of identifiers of terminal devices that have been obtained in a previous discovery procedure, a radio quality indication of a PC5 or Uu link the second terminal device currently has, a load or a congestion condition of the PC5 or Uu link, an RAT of the PC5 or Uu link, an indication of a relay type the second terminal device requests or is capable of providing, or a number of hops or a maximum number of hops along a relay path the second terminal device requests or is capable of providing.

In an embodiment, the first message may further contain a measurement configuration for the second terminal device to measure a PC5 link towards the third terminal device or a fifth terminal device, or a Uu link towards the network node, and the second message further contains a measurement report for the PC5 link or the Uu link.

In an embodiment, the memory 930 may further contain instructions executable by the processor 920 whereby the second terminal device 900 is operative to: receive the measurement configuration from a network node.

In an embodiment, the memory 930 may further contain instructions executable by the processor 920 whereby the second terminal device 900 is operative to: receive an authorization to engage in the discovery procedure from a network node.

In an embodiment, the first location or mobility related information and/or the first connectivity related information may be received explicitly in one or more fields in the first message or included in a container in the first message.

In an embodiment, the second location or mobility related information and/or the second connectivity related information may be transmitted explicitly in one or more fields in the second message or included in a container in the second message.

Figure 10:
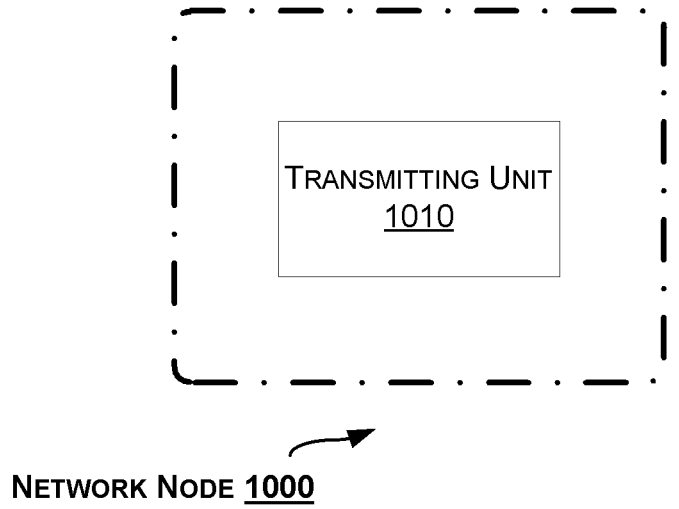
FIG. 10 is a block diagram of a network node according to an embodiment of the present disclosure.

Correspondingly to the method 500 as described above, a network node is provided. FIG. 10 is a block diagram of a network node 1000 according to an embodiment of the present disclosure. The network node 1000 can be e.g., a serving network node of the above first or second terminal device.

The network node 1000 can be configured to perform the method 500 as described above in connection with FIG. 5. As shown in FIG. 10, the network node 1000 includes a transmitting unit 1010 configured to: transmit, to a terminal device, an authorization to initiate or engage in a discovery procedure; and transmit, to the terminal device, a measurement configuration for the terminal device to measure a PC5 link or a Uu link towards a network node or another terminal device.

In an embodiment, the authorization and/or the measurement configuration may be transmitted via SIB or RRC signaling.

The above unit 1010 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5.

Figure 11:
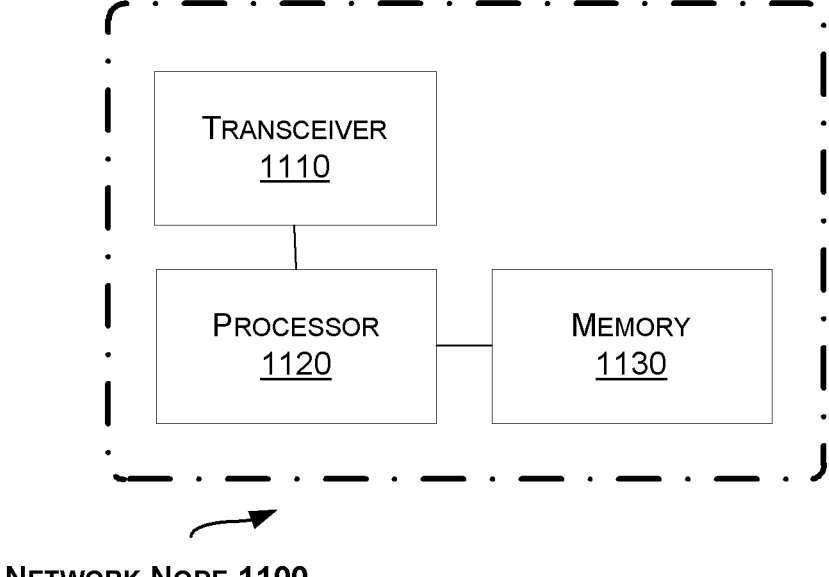
FIG. 11 is a block diagram of a network node according to another embodiment of the present disclosure.

FIG. 11 is a block diagram of a network node 1100 according to another embodiment of the present disclosure. The network node 1100 can be e.g., a serving network node of the above first or second terminal device.

The network node 1100 includes a transceiver 1110, a processor 1120 and a memory 1130. The memory 1130 contains instructions executable by the processor 1120 whereby the network node 1100 is operative to perform the actions, e.g., of the procedure described earlier in conjunction with FIG. 5. Particularly, the memory 1130 can contain instructions executable by the processor 1120 whereby the network node 1100 is operative to: transmit, to a terminal device, an authorization to initiate or engage in a discovery procedure; and transmit, to the terminal device, a measurement configuration for the terminal device to measure a PC5 link or a Uu link towards a network node or another terminal device.

In an embodiment, the authorization and/or the measurement configuration may be transmitted via SIB or RRC signaling.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 720 causes the first terminal device 700 to perform the actions, e.g., of the procedure described earlier in conjunction with FIG. 3, or code/computer readable instructions, which when executed by the processor 920 causes the second terminal device 900 to perform the actions, e.g., of the procedure described earlier in conjunction with FIG. 4, or code/computer readable instructions, which when executed by the processor 1120 causes the network node 1100 to perform the actions, e.g., of the procedure described earlier in conjunction with FIG. 5.

The computer program product may be configured as a computer program code structured in computer program modules. The computer program modules could essentially perform the actions of the flow illustrated in FIG. 3, 4, or 5.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

Figure 12:
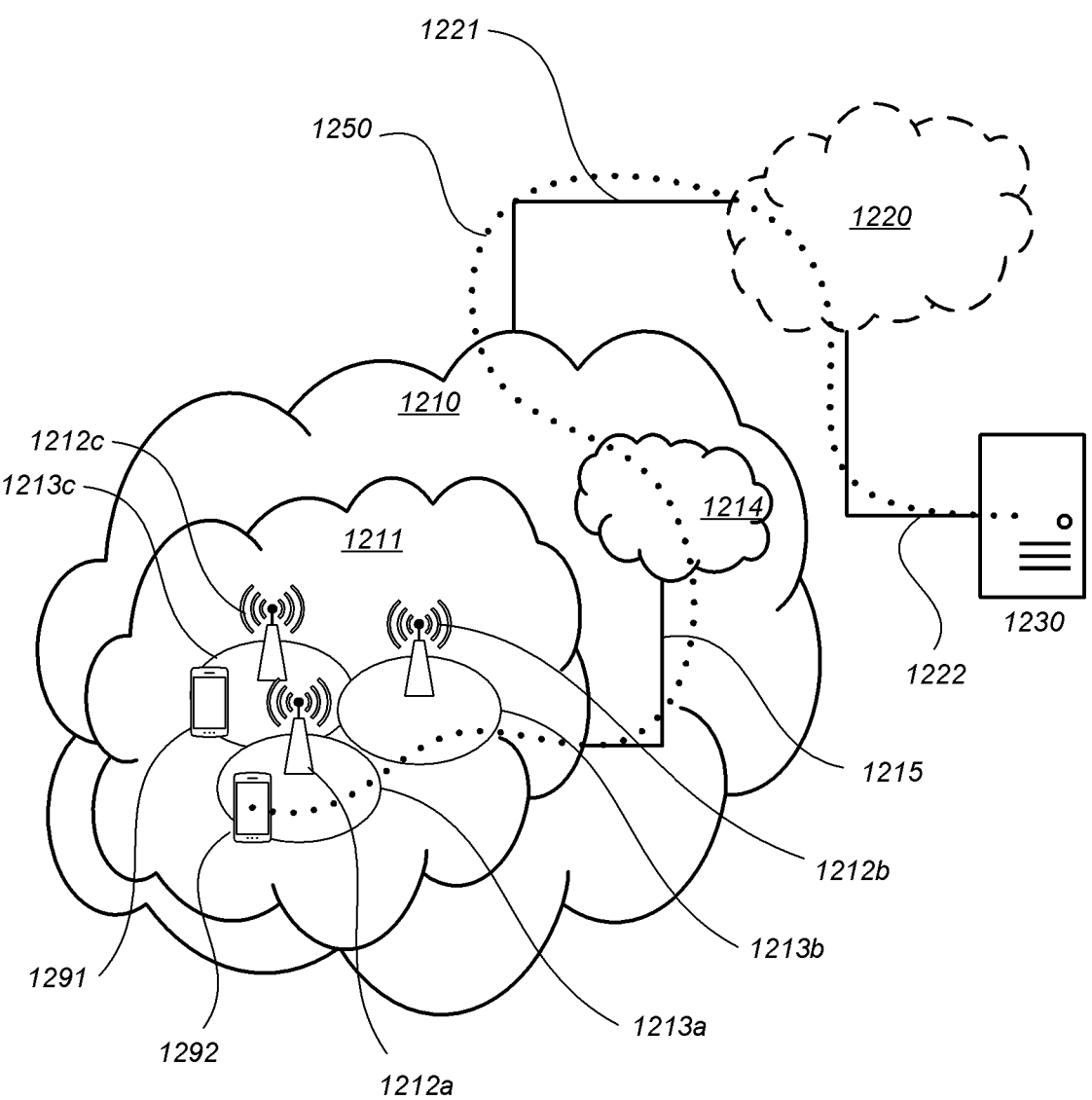
FIG. 12 schematically illustrates a telecommunication network connected via an intermediate network to a host computer.

With reference to FIG. 12, in accordance with an embodiment, a communication system includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first UE 1291 located in a coverage area 1213c is configured to wirelessly connect to, or be paged by, the corresponding base station 1212c. A second UE 1292 in a coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. Connections 1221 and 1222 between the telecommunication network 1210 and the host computer 1230 may extend directly from the core network 1214 to the host computer 1230 or may go via an optional intermediate network 1220. An intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises a processing circuitry 1318, which may have storage and/or processing capabilities. In particular, the processing circuitry 1318 may comprise one or more programmable processors, application-specific integrated circuits, field programmable gate arrays or combinations of these (not shown)

adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes a processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes a processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
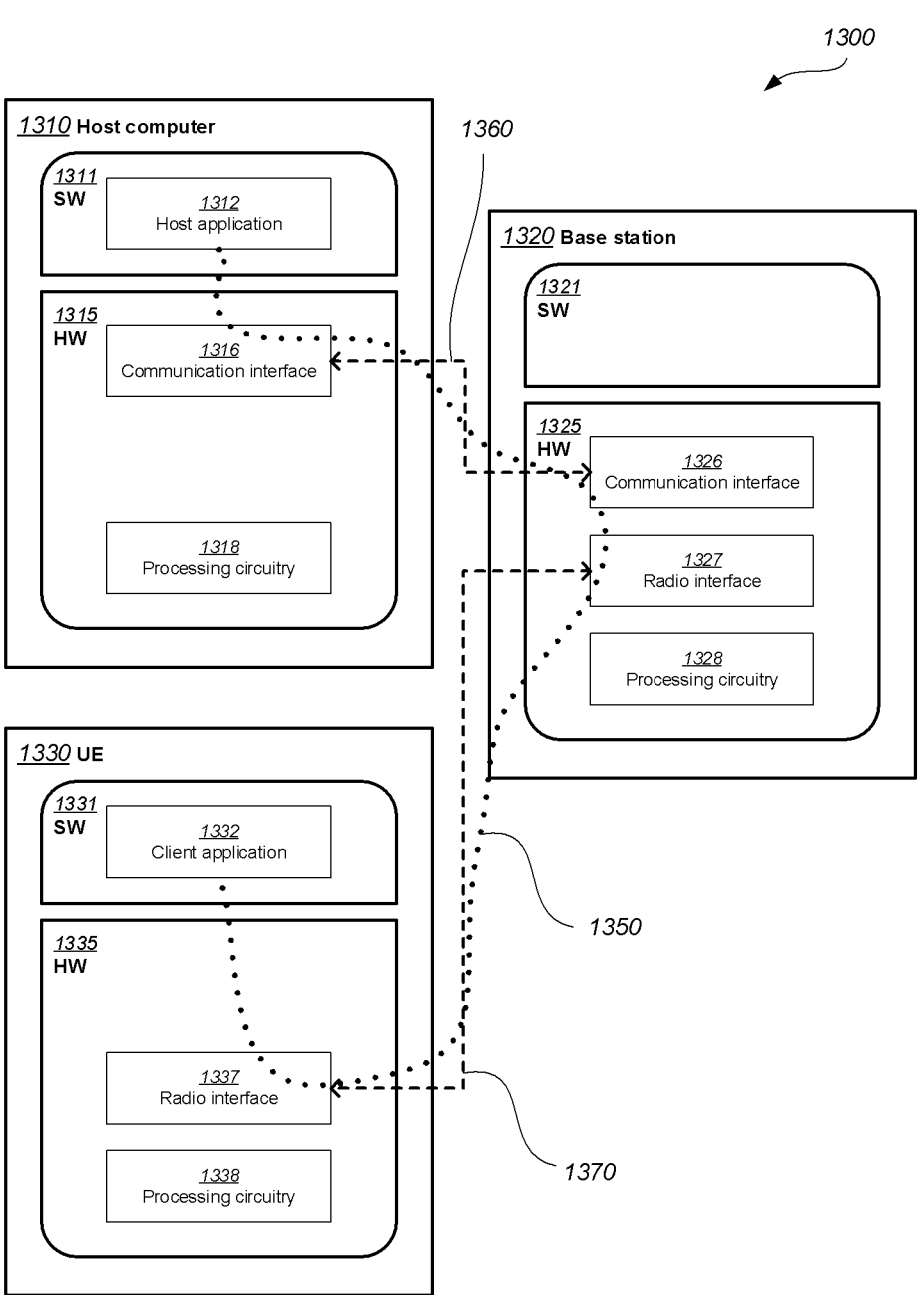
FIG. 13 is a generalized block diagram of a host computer communicating via a base station with a user equipment over a partially wireless connection.

It is noted that the host computer 1310, the base station 1320 and the UE 1330 illustrated in FIG. 13 may be similar or identical to the host computer 1930, one of base stations 1912*a*, 1912*b*, 1912*c* and one of UEs 1991, 1992 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

Wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the communication quality and efficiency, and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in software 1311 and hardware 1315 of the host computer 1310 or in software 1331 and hardware 1335 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency and the like. The measurements may be implemented in that the software 1311 and 1331 causes messages to be transmitted, in particular empty or 'dummy' messages, using the OTT connection 1350 while it monitors propagation times, errors etc.

FIG. 14 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figures 16, 17:
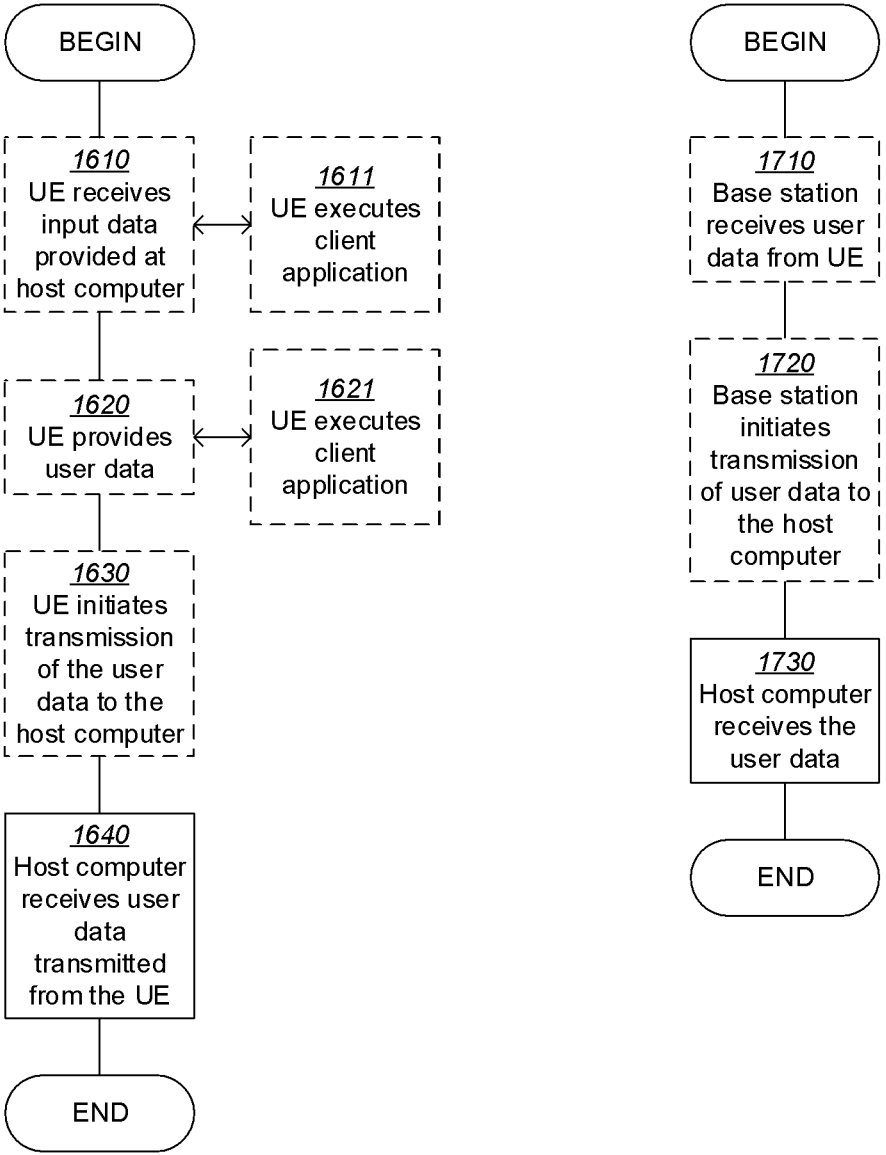

FIG. 16 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

Hereinafter, the solutions will be further described as follows.

The methods and solutions disclosed in the present disclosure is based on the following novelty aspects:

Sidelink discovery announcement and response message are enhanced with additional information regarding e.g. (but not limited to), The type of traffic the remote UE needs to transmit toward the NW or another remote UE, The requirements are expected to be fulfilled The channel quality of the relay UE towards the NW or another remote UE Number of remote UEs with which the relay UE has currently a relay path established.

The relay UE, when sending the discovery announcement or response message, it includes a timer so to inform the remote UE about for how long the information that are received are valid. Alternatively, this validity timer can be configured by the network or fixed in the specification (e.g., a unique validity timer for all the relay UEs).

Once received all the discovery announcement or responses by the relay UEs in proximity, the remote UE make a list by ordering those relay UEs according to a certain criteria (e.g., type of traffic that a relay UE can provide, current channel conditions of the relay UE toward a NW or another remote UE, number of remote UE with which the relay UE has a relay path).

Once the list is built, the remote UE try to establish a relay path with the first relay UE of the list. However, if the relay path establishment fails, the remote UE can avoid performing again a discovery procedure by selecting the second relay UE of the list (as far as the discovery validity timer for that given remote UE has not expired). The procedure will continue until a suitable relay UE is found or a new discovery procedure needs to be triggered (i.e., this means that all the discovery validity timer of the relay UEs in the list have expired).

With the methods and solutions disclosed in the present disclosure, the latency, power consumption and signaling overhead are improved with performing the discovery procedure in the UE-to-NW and UE-to-UE relay scenarios.

This will be particular important when the requirements on public safety and V2X use cases need to be met.

The methods and solution disclosed in the following, are referring to the NR RAT but can be applied also to LTE RAT and any other RAT enabling the transmission on two nearby devices without any loss of meaning.

Further, we refer to RM UE as the remote UE that need to transmit/receive packet from/to the gNB or another UE (called receiver remote UE) via an intermediate network node/mobile terminal (relay) that we refer to as RL UE.

The proposed methods and solutions can be applied without any loss of meaning to the UE-to-NW and UE-to-UE scenario and to the L2 and L3 architectures (and any combination of them).

The embodiments use the term "announcement message" or "solicitation message" to stand for the first message for the discovery procedure. The embodiments use the term "response" or "report" to stand for the second message for the discovery procedure. The embodiments are not limited by any term. Any similar term is interchangeably applicable.

The embodiments are applicable to both the discovery Model A and the discovery Model B.

Initiating UE Embodiments (UE that Initiates the Discovery Procedure)

In the first embodiment, before establishing a relay path connection between a remote UE and a relay UE, the initiating UE (remote UE or the relay UE) starts a discovery procedure. Besides the information content as captured in clause 6.1.2.2 of TR 23.752, i.e., 1) ProSe UE ID e.g. ProSe application user ID, Layer 2 ID.

2) The group ID(s) provided by the application layer.

3) The application ID(s) or ProSe application code(s) provided the application layer, the first message on PC5 may also include at least one of the below information (but not limited):

QoS profile of interested traffic or application

E.g., type, priority index, QoS requirements of interested traffic or application Location information or interested proximity or area where the traffic or application will take place of the initiating UE or interested UEs Mobility information of the initiating UE or interested UEs (whether the UE is static or is moving, and what type of mobility e.g., pedestrian, vehicle)

A validity timer for how long the provided information are valid

Serving gNB of the initiating UE or interested UEs

Destination ID (it may represent an ID or just an indication on whether the end point of the traffic is the cellular NW or another UE)

Proximity UEs IDs (if already discovered), such information may be used to assist the discovery procedure Radio channel quality indicator of the concerned PC5 links or Uu links, these links are directly or indirectly connecting to the relay path Load measurement or congestion situation of the concerned PC5 links or Uu links, these links are directly or indirectly connecting to the relay path RAT type of the concerned PC5 links or Uu links, these links are directly or indirectly connecting to the relay path Relay type (UE to network relay or UE to UE relay)

Number of hops of the whole relay path or maximum number of the hops of the whole relay path In addition, for any ID in the above, the ID may be a temporary ID, meaning that the ID may be used only for the discovery procedure. After the discovery procedure, the ID becomes invalid.

In the second embodiment, upon receiving a first discovery message, a receiving UE (e.g., relay or remote UE) can build a list of UEs (i.e., who have initiated a discovery procedure) toward which it is possible to select one or multiple UEs, to start a relay path establishment between the receiving UE and them. How to select the candidate UEs and order the candidate UEs in the list may consider one or multiple of the information element which are described in the first embodiment.

In the third embodiment, once the remote UE has ordered the candidates relay UEs in a list (according to certain criteria), the remote UE triggers a relay path establishment towards the first relay UE of the list (i.e., in the first position).

If the relay path establishment with the chosen relay UE succeeds, the discovery procedure ends and the remote UE clear from its memory the list with the discovered relay UEs. Alternatively, if the relay path establishment succeeds, the remote UE keeps the list of candidate relay UEs in his memory and delete one (or multiple) relay UEs from this list only when the discovery validity timer for the given UE(s) has expired. Yet, in another alternative, if the relay path establishment succeeds, the remote UE keeps the list of candidate relay UEs in his memory until a new discovery procedure is triggered.

If the relay path establishment with the chosen relay UE fails, the remote UE triggers a relay path establishment with the relay UE in the second position, if the discovery validity timer linked to this relay UE is not expired. The remote UE will continue to scroll the list of the relay UEs until the relay path establishment procedure succeeds or all the relay UEs in the list have been tried.

In the fourth embodiment, when the current relay path becomes unavailable due to e.g. the link quality between the remote UE and the relay UE becomes bad, the remote UE could trigger a path switching and a path establishment with an available relay UE in the stored list of candidate relay UEs w/o performing a discovery first, here available relay UE means the discovery validity timer linked to the relay UE is not expired. A discovery procedure may be initialized if the relay path establishment fails for all the available relay UEs in the list candidate relay UEs.

In the fifth embodiment, if the remote UE is interested to know what channel conditions the relay UE has towards the destination of the relay path (e.g., a gNB or one or multiple destination UEs), the remote UE includes a measurement configuration within the discovery announcement message. The measurement configuration may also be provided by the NW or preconfigured. Alternatively, the remote UE may include (also) an interest in receiving measurements from the relay UE (this it may just be a bit that the remote UE needs to tick).

Responding UE Embodiments (UE that Respond to a Discovery Request—Discovery Response).

In the sixth embodiment, within the second discovery message from the receiving UE (relay or remote UE depending on whether Model A or Model B is applied), at least one of the following information may be included (but not limited to):

UE identity (global)

Relay UE ID (used only for relay communications)

Temporary UE ID (may be used only for the discovery procedure)

Type of traffic that can be handled

Channel measurements towards the destination of the relay path (e.g., a gNB or another/multiple UEs)

Location information.

Traffic load at the relay UE over Uu and/or SL.

QoS that can be supported or bearer/LCH that is allowed to be configured over Uu and/or SL.

Mobility information (whether the relay UE is static or is moving, and what type of mobility e.g., pedestrian, vehicle)

Serving gNB (if the UE is in coverage)

Proximity UEs IDs (if already discovered)

It informs the IDs of UEs that are connected to/discovered by the relay UE in case it is a discovery announcement from the relay UE.

It informs the IDs of the UEs which are the destination UEs of the remote UE and are connected to/discovered by the relay UE in case it is a discovery response from the relay UE.

The discovery announcement may only include the Proximity UEs IDs with good channel quality to the relay UE. A threshold could be (pre)configured to determine whether the channel quality is good enough.

A validity timer to advertise for how long the provided information are valid

Relay type (it indicates whether the end point of the possible relay path is a gNB (i.e. UE to NW relay) or another UE (UE to UE relay)).

In a seventh embodiment, if measurements (e.g., towards a gNB or another/multiple UEs) are included in the discovery announcement/response message, the relay UE orders these measurements based on the destination (e.g., gNB or one or multiple UEs) and based on the RSRP, RSRQ, or SINR.

Further, if the relay UE has no measurements available at the time of sending the discovery announcement/response, the relay UE performs measurements first and then include them in the discovery announcement/response message. When performing measurements, the relay UE may use a configuration provide by the serving gNB (via SIB or via dedicated RRC signaling) or may use a configuration provided by the remote UE in the discovery request message or use a preconfiguration.

Other Embodiments (NW Embodiments and Implementation Embodiments)

In the eighth embodiment, the NW configures the UE under his coverage whether they are allowed to transmit discovery announcement/response messages. The way how the network configures his UEs can be via system information (SIB) or via dedicated RRC signaling. If the network allows one or multiple UE to perform the discovery procedure, also a measurement configuration to be used during the discovery procedure is sent (the relay UE uses this measurement configuration in performing measurement before sending the discovery announcement/response).

In the ninth embodiment, if the remote/relay UE needs to include AS configuration/information within the discovery messages, this is done in an explicit way within the discovery announcement or response message (this means that the AS-related fields are simply provided as "fields" within the discovery messages). Alternatively, the AS-related configuration/parameters may be included in a container (OCTET STRING) within the discovery messages without, then, including explicitly these information as fields (this mean that the container will work as a pointer to a part of a specification where this AS-related configuration/parameters are standardized).

The invention claimed is:

1. A method in a first terminal device, comprising: transmitting, to a second terminal device, a first message for initiating a discovery procedure over a sidelink, wherein the first message contains information associated with the first terminal device, comprising:
first application or traffic related information,
first location or mobility related information, and
first connectivity related information comprising an indication of whether the first terminal device requests or is capable of providing a relay path towards a network node or a terminal device.

2. The method of claim 1, wherein the first message further contains a first validity timer indicating a duration during which the information associated with the first terminal device is valid.

3. The method of claim 1, wherein the first application or traffic related information comprises a Quality of Service, QoS, profile of an application or traffic the first terminal device requests or is capable of providing.

4. The method of claim 3, wherein the QoS profile comprises a type, a priority, and/or a QoS requirement of the application or traffic.

5. The method of claim 1, wherein the first location or mobility related information comprises one or more of:
location information of the first terminal device,
information on an area or proximity where the first terminal device requests or is capable of providing an application or traffic, or
mobility information of the first terminal device.

6. The method of claim 5, wherein the mobility information of the first terminal device indicates whether the first terminal device is static or moving.

7. The method of claim 1, wherein the first connectivity related information comprises:
a serving network node of the first terminal device,
a list of identifiers of terminal devices that have been obtained in a previous discovery procedure,
a radio quality indication of a PC5 or Uu link the first terminal device currently has,
a load or a congestion condition of the PC5 or Uu link,
a Radio Access Technology, RAT, of the PC5 or Uu link,
an indication of a relay type the first terminal device requests or is capable of providing, or
a number of hops or a maximum number of hops along a relay path the first terminal device requests or is capable of providing.

8. The method of claim 1, further comprising:
receiving, from the second terminal device, a second message as a response to the first message,
wherein the second message contains one or more of following information associated with the second terminal device:
identifier information,
second application or traffic related information,
second location or mobility related information, or
second connectivity related information.

9. The method of claim 7, wherein the identifier information comprises one or more of: a global identifier of the second terminal device, a temporary identifier of the second terminal device, and/or an identifier of the second terminal device used only when the second terminal device serves as a relay for the first terminal device.

10. The method of claim 7, wherein the second application or traffic related information comprises a Quality of Service, QoS, profile of an application or traffic the second terminal device requests or is capable of providing.

11. The method of claim 10, wherein the QoS profile comprises a type, a priority, and/or a QoS requirement of the application or traffic the second terminal device requests or is capable of providing.

12. The method of claim 7, wherein the second location or mobility related information comprises one or more of:
location information of the second terminal device,
information on an area or proximity where the second terminal device requests or is capable of providing an application or traffic, or
mobility information of the second terminal device.

13. The method of claim 7, wherein the second connectivity related information comprises:
a serving network node of the second terminal device,
an indication of whether the second terminal device requests or is capable of providing a relay path towards a network node or a terminal device,
a list of identifiers of terminal devices that have been obtained in a previous discovery procedure, a radio quality indication of a PC5 or Uu link the second
    terminal device currently has,
a load or a congestion condition of the PC5 or Uu link,
a Radio Access Technology, RAT, of the PC5 or Uu link,
an indication of a relay type the second terminal device
    requests or is capable of providing, or
a number of hops or a maximum number of hops along a
    relay path the second terminal device requests or is
    capable of providing.

14. The method of claim 7, further comprising:
obtaining a set of relay candidates, including the second
    terminal device, based at least on the second message;
selecting, from the set of relay candidates, the second
    terminal device as a relay between the first terminal
    device and a network node or a third terminal device,
    based on the second application or traffic related infor-
    mation, the second location or mobility related infor-
    mation, and/or the second connectivity related infor-
    mation; and
establishing a relay path from the first terminal device to
    the network node or the third terminal device via the
    second terminal device.

15. The method of claim 14, further comprising:
selecting, from the set of relay candidates, a fourth
    terminal device as a relay between the first terminal
    device and the network node or the third terminal
    device in response to a failure of the relay path, based
    on application or traffic related information, location or
    mobility related information, and/or connectivity
    related information associated with the fourth terminal
    device; and
establishing a relay path from the first terminal device to
    the network node or the third terminal device via the
    fourth terminal device.

16. The method of claim 14, further comprising:
initiating another discovery procedure over the sidelink
    when all the relay candidates in the set have their
    respective validity timers expired.

17. The method of claim 7, wherein the first message
further contains a measurement configuration for the second
terminal device to measure a PC5 link towards the third terminal device or a fifth terminal device, or a Uu link
towards the network node, and the second message further
contains a measurement report for the PC5 link or the Uu
link.

18. The method of claim 1, wherein the first location or
mobility related information and/or the first connectivity
related information is transmitted explicitly in one or more
fields in the first message or included in a container in the
first message.

19. The method of claim 7, wherein the second location
or mobility related information and/or the second connec-
tivity related information is received explicitly in one or
more fields in the second message or included in a container
in the second message.

20. A method in a second terminal device, comprising:
receiving, from a first terminal device, a first message for
    initiating a discovery procedure over a sidelink,
wherein the first message contains information associated
    with the first terminal device, comprising:
    first application or traffic related information,
    first location or mobility related information, and
    first connectivity related information comprising an
        indication of whether the first terminal device
        requests or is capable of providing a relay path
        towards a network node or a terminal device.

21. A first terminal device, comprising a transceiver, a
processor and a memory, the memory comprising instruc-
tions executable by the processor whereby the first terminal
device is operative to:
transmit, to a second terminal device, a first message for
    initiating a discovery procedure over a sidelink,
wherein the first message contains information associated
    with the first terminal device, comprising:
    first application or traffic related information,
    first location or mobility related information, and
    first connectivity related information comprising an
        indication of whether the first terminal device
        requests or is capable of providing a relay path
        towards a network node or a terminal device.

* * * * *